US009148083B2

(12) United States Patent
Olsson et al.

(10) Patent No.: US 9,148,083 B2
(45) Date of Patent: Sep. 29, 2015

(54) SYSTEM AND METHOD OF DYNAMIC REGULATION OF REAL POWER TO A LOAD

(75) Inventors: Eric Jon Olsson, Menomonee Falls, WI (US); Bin Lu, Shanghai (CN); Ting Yan, Menomonee Fallas, WI (US); Steven John Fredette, Waukesha, WI (US); Charles John Luebke, Hartland, WI (US)

(73) Assignee: Eaton Corporation, Cleveland, OH (US)

( * ) Notice: Subject to any disclaimer, the term of this patent is extended or adjusted under 35 U.S.C. 154(b) by 361 days.

(21) Appl. No.: 13/551,973

(22) Filed: Jul. 18, 2012

(65) Prior Publication Data

US 2012/0280645 A1 Nov. 8, 2012

Related U.S. Application Data

(63) Continuation-in-part of application No. 12/541,320, filed on Aug. 14, 2009, now Pat. No. 8,232,760.

(60) Provisional application No. 61/186,287, filed on Jun. 11, 2009.

(51) Int. Cl.
*H02P 23/00* (2006.01)
*H02P 23/02* (2006.01)
(Continued)

(52) U.S. Cl.
CPC ............ *H02P 23/02* (2013.01); *H02P 23/0077* (2013.01); *H02P 23/14* (2013.01); *H02P 27/047* (2013.01)

(58) Field of Classification Search
USPC ............ 318/801–803, 807, 400.12, 607, 110, 318/723, 503, 811; 323/239, 223, 224, 225, 323/360, 351; 363/34, 35, 37, 41, 95, 96, 363/98
See application file for complete search history.

(56) References Cited

U.S. PATENT DOCUMENTS

| 4,052,648 | A | 10/1977 | Nola |
|---|---|---|---|
| 5,329,223 | A | 7/1994 | Riggio |

(Continued)

FOREIGN PATENT DOCUMENTS

| EP | 0330477 B1 | * | 5/1989 |
|---|---|---|---|
| EP | 0330477 A2 | | 8/1989 |

OTHER PUBLICATIONS

Jian et al., "Characteristic Induction Motor Slip Values for Variable Voltage Part Load Performance Optimization," IEEE Transactions on Power Apparatus and Systems, vol. PAS-102, No. 1, Jan. 1983, pp. 38-46.

(Continued)

*Primary Examiner* — Kawing Chan
*Assistant Examiner* — Jorge L Carrasquillo
(74) *Attorney, Agent, or Firm* — Ziolkowski Patent Solutions Group, SC

(57) ABSTRACT

A system and method for controlling an AC motor drive includes a control system programmed with an algorithm configured to optimize operation of the motor drive. Specifically, the control system is programmed to input an initial voltage-frequency command to the drive. The initial voltage-frequency command includes a voltage reference and a frequency reference corresponding to an operating point of an initial voltage/frequency (V/Hz) curve. The control system monitors a real-time output of the drive, modifies the voltage reference based on the real-time output of the drive, and transmits a modified voltage-frequency command to the drive. The modified voltage-frequency command corresponds to an operating point of a modified V/Hz curve defined by the modified voltage reference and the initial V/Hz curve.

18 Claims, 12 Drawing Sheets

(51) Int. Cl.
*H02P 23/14* (2006.01)
*H02P 27/04* (2006.01)

(56) References Cited

U.S. PATENT DOCUMENTS

| | | | |
|---|---|---|---|
| 5,548,199 A | 8/1996 | Bidaud et al. | |
| 5,646,499 A | 7/1997 | Doyama et al. | |
| 5,959,431 A * | 9/1999 | Xiang | 318/811 |
| 6,222,335 B1 | 4/2001 | Hiti et al. | |
| 6,388,419 B1 | 5/2002 | Chen et al. | |
| 6,984,953 B2 | 1/2006 | Quirion et al. | |
| 7,449,860 B2 | 11/2008 | Sarlioglu et al. | |
| 7,468,595 B2 | 12/2008 | Lee et al. | |
| 7,626,836 B2 * | 12/2009 | Leggate et al. | 363/41 |
| 2005/0046489 A1 | 3/2005 | Cranford, Jr. et al. | |
| 2006/0038530 A1 * | 2/2006 | Holling | 318/807 |
| 2006/0071629 A1 | 4/2006 | Holling et al. | |
| 2007/0024231 A1 * | 2/2007 | Lee et al. | 318/802 |
| 2010/0315033 A1 | 12/2010 | Lu et al. | |

OTHER PUBLICATIONS

Abrahamsen et al., "On the Energy Optimized Control of Standard and High-Efficiency Induction Motors in CT and HVAC Applications," Annual Meeting, New Orleans, Lousiana, Oct. 5-9, 1997, pp. 621-628.

Performance Testing Results for FlexMod Controller, Advanced Energy, Raleigh, NC, Nov. 2006, pp. 1-43.

Kioskeridis et al., "Loss Minimization in Scalar-Controlled Induction Motor Drives with Search Controllers," IEEE Transactions on Power Electronics, vol. 11, No. 2, Mar. 1996, pp. 213-220.

* cited by examiner

SYSTEM AND METHOD OF DYNAMIC REGULATION OF REAL POWER TO A LOAD

CROSS-REFERENCE TO RELATED APPLICATION

The present invention is a continuation-in-part of and claims the benefit of U.S. Non-Provisional application Ser. No. 12/541,320, filed Aug. 14, 2009, which claims the benefit of U.S. Provisional Application Ser. No. 61/186,287, filed Jun. 11, 2009, the disclosures of which are incorporated herein by reference.

BACKGROUND OF THE INVENTION

The present invention relates generally to AC motors and, more particularly, to a system and method for reducing real power usage of open-loop AC motor drive systems (which can include at least a motor drive, a motor, and a connected load).

Open-loop AC motor drives are typically programmed to operate based on a voltage/frequency (V/Hz) operating curve. Because the V/Hz settings of an open-loop motor drive is typically adjustable only while the drive is not in operation and/or the actual motor loading conditions are not known at time of drive commissioning, the V/Hz operating curve is typically a pre-set and static curve that is programmed during the initial installation and setup of the drive. The motor drive may be programmed with a first order or linear V/Hz operating curve to maintain a constant ratio between the voltage and frequency applied to the motor. Such an operating curve maintains a constant flux in the air-gap and, therefore, generates constant torque in the motor. Alternatively, a second order V/Hz curve may be selected, where the output torque is approximately proportional to the square of the motor speed. Some motor drives also provide preset user-programmable V/Hz settings to meet the requirement for special applications. Once programmed, the motor drive typically operates based on the pre-set operating curve during the lifetime of the drive unless an operator changes the drive setting at a later time.

Some drives today have energy saving options, such as "Flux Minimization" or "Flux Optimization." These options are often designed to dynamically seek a minimal current or flux in the motor, but not the overall motor input power. These options typically select a motor voltage which is between the linear V/Hz setting and the quadratic V/Hz setting.

Typically, the linear V/Hz curve, commonly referred as constant V/Hz curve, is the default setting of the majority of open-loop motor drives. While the linear V/Hz curve settings for a given motor drive are typically programmed to provide constant torque to the load, such constant torque output is not needed for many variable torque applications. Therefore, the V/Hz curve settings often result in wasted energy and inefficient operation of the motor drive system, especially the motor and its connected load.

Furthermore, because the V/Hz curve settings are static, the motor drive operates independently of any changes in operating conditions. Although some motor drives may allow a user to alter the V/Hz curve by, for example, adjusting the start, middle, and/or end points of the V/Hz curve, such programming cannot be performed automatically by the drive itself and may be completed only when the motor is shutdown. This typically requires a skilled technician who has a thorough understanding of the both motor drive and the loading profile of the specific motor and load application.

Another reason why an operator commissioning a drive typically selects a linear V/Hz curve is that the linear V/Hz curve provides constant torque and minimizes the risk that the actual torque using a non-linear V/Hz curve (e.g., second order curve) may not be sufficient to meet the load torque demand for variable torque applications. This is particularly true if the operator commissioning the drive does not fully understand the load profile of the motor application where the drive is installed. For example, in waste water treatment plants, the pump motors are often designed to meet the peak demand when heavy rain occurs in the summer. During the majority of the year, however, the load percentage of the pump motor can be very low. Using a second order V/Hz curve in this application may be risky because the second order V/Hz curve may not provide enough torque when a heavy rain event occurs. Also, the operator who commissions the drive is usually not the same person in a plant who is responsible for monitoring and controlling energy savings. Thus, there may be little incentive for the operator who commissions the drive to select a different V/Hz curve setting for energy savings over the standard linear V/Hz curve settings.

It would therefore be desirable to design a system and method for dynamically adjusting the V/Hz operating curve of an AC motor drive during motor operation to minimize the motor input real power and achieve additional energy savings. It would further be desirable for such a system and method to be capable of responding to changes in the speed reference of the motor drive while maintaining stable motor operating conditions.

BRIEF DESCRIPTION OF THE INVENTION

The present invention provides a system and method for controlling an AC motor drive connected to a load that overcomes the aforementioned drawbacks.

In accordance with one aspect of the invention, a control system for controlling a drive for an AC motor is programmed to input an initial voltage-frequency command to the drive, the initial voltage-frequency command comprising a voltage reference and a frequency reference corresponding to an operating point of an initial voltage/frequency (V/Hz) curve, monitor a real-time output of the drive, modify the voltage reference based on the real-time output of the drive, and transmit a modified voltage-frequency command to the drive, the modified voltage-frequency command corresponding to an operating point of a modified V/Hz curve defined by the modified voltage reference and the initial V/Hz curve.

In accordance with another aspect of the invention, a method for controlling an output of a motor drive includes operating the motor drive according to a static voltage-frequency profile to generate an output power to drive a motor and determining an initial value of a specified motor parameter corresponding to the static voltage-frequency profile. The method also includes modifying a voltage reference command during operation of the motor drive to generate a reduced motor input power, defining a modified voltage-frequency profile based on the modified voltage reference command and an operating point of the static voltage-frequency profile, and operating the motor drive according to the modified voltage-frequency profile.

In accordance with yet another aspect of the invention, a motor drive is configured to supply power to a load and includes an inverter designed to provide power to the load and a controller operationally connected to control operation of the inverter. The controller is configured to monitor a real-time value of a motor parameter during operation of the motor drive and incrementally adjust a voltage reference during operation of the motor drive based on the real-time value of the motor parameter to cause the inverter to operate at a modified operation point, wherein the modified operation point comprises a deviation from an initial V/Hz curve. The controller is further configured to define a modified V/Hz curve based on the modified operation point and an operating point of the initial V/Hz curve and incrementally adjust a voltage-frequency command according to the modified V/Hz curve.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE INVENTION

Several embodiments of the invention are set forth that relate to a system and method of controlling an AC motor drive connected to a load that overcomes the aforementioned drawbacks. These embodiments of the invention are directed to an energy-optimizing control system for open-loop motor drives encompassing a plurality of structures and control schemes.

Figure 1:
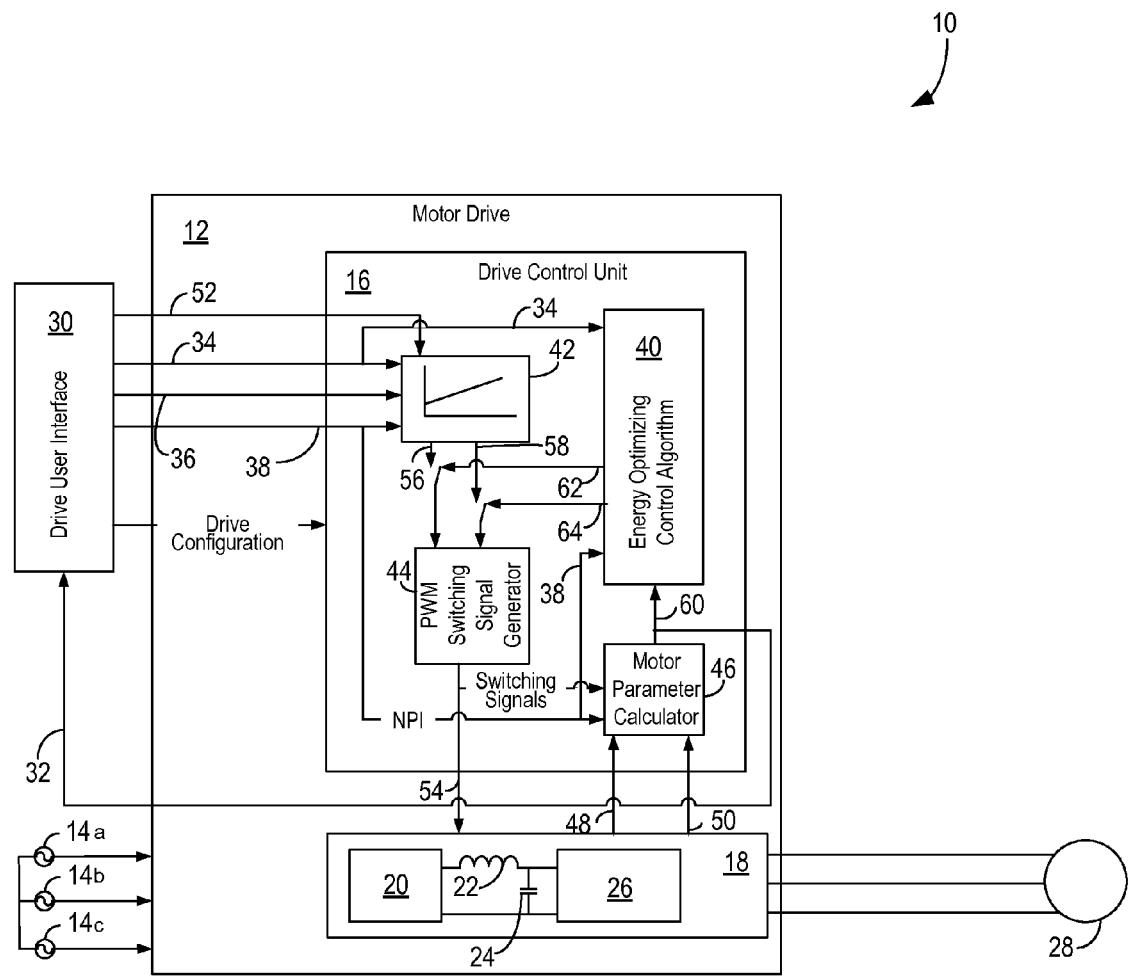
FIG. 1 is schematic of a control system including a motor drive system according to one aspect of the invention.

A general structure of a motor drive system 10 and an associated AC motor drive 12 is shown in FIG. 1. The motor drive 12 may be configured, for example, as an adjustable speed drive designed to receive a three-phase AC power input 14a-14c, rectify the AC input, and perform a DC/AC conversion of the rectified segment into a three-phase alternating voltage of variable frequency and amplitude that is supplied to a load. According to one embodiment, a drive control unit 16 may be integrated within motor drive 12 and function as part of the internal logic of motor drive 12. Alternatively, drive control unit 16 may be embodied in an external module distinct from motor drive 12, and receive data therefrom (e.g., voltage and/or current signals), as described in more detail with respect to FIGS. 2 and 3.

Referring to FIG. 1, in an exemplary embodiment, motor drive 12 includes a drive power block unit 18, which may, for example, contain a uncontrollable or controllable rectification unit 20 (uncontrolled AC to DC), a filtering inductor 22, a DC bus capacitor 24, and a pulse width modulation (PWM) inverter 26 (DC to controlled AC). Alternatively, drive power block unit 18 may be provided without such a rectification unit such that the DC bus is directly connected to the inverter. A drive power block unit may be provided without a rectification unit when applied to an uninterruptible power supply (UPS), for example.

Motor drive 12 receives the three-phase AC input 14a-14c, which is fed to the rectification unit 20. The rectification unit 20 converts the AC power input to a DC power such that a DC bus voltage is present between rectification unit 20 and PWM inverter 26, which inverts and conditions the DC power to a controlled AC power for transmission to an AC motor 28. PWM inverter 26 includes a plurality of switches (not shown) and is configured to operate according to a PWM control scheme, such as, for example, a Space Vector Modulation (SVM) control scheme or a Sinusoidal-Triangle PWM control scheme, to control the plurality of switches, thereby producing the controlled AC power output. According to an exemplary embodiment, PWM inverter 26 is configured to operate according to a SVM control scheme.

Drive control unit 16 operates to generate the SVM control scheme for the PWM inverter 26. More specifically, the SVM control scheme for the PWM inverter 26 is generated by motor drive system 10 based on a voltage-frequency (V/Hz) setting or command (i.e., V/Hz profile or curve) used for operating motor drive 12. According to an exemplary embodiment of the invention, motor drive system 10 is programmed to dynamically adjust the voltage and frequency applied to motor 28 based on motor or load demand, which in effect dynamically adjusts the shape or profile of the pre-set V/Hz curve (and the associated SVM control scheme) internal to motor drive 12.

Motor drive 12 further includes a drive user interface 30 or drive control panel, configured to input motor parameters 32 and output a frequency reference 34, a boost voltage 36, which is which is used to produce starting torque to accelerate motor from zero speed, and motor nameplate information (NPI) 38. User interface 30 is also used to display a list of motor operating parameters, such as, for example motor output voltage (rms), motor current (rms), motor input power, speed, torque, etc., to the user for monitoring purposes.

As shown in FIG. 1, drive control unit 16 includes a control algorithm module 40, an existing or preset V/Hz curve 42, a signal generator 44 for generating the SVM control, and a motor parameter calculator 46. Drive control unit 16 functions to receive an output from drive power block unit 18, determine and monitor motor parameter(s), and determine an optimal voltage and frequency based on the determined motor parameter(s) to generate a SVM control scheme for operating motor drive 12.

According to an embodiment of the invention, drive control unit 16 receives DC bus voltage signal 48 and motor input current signals 50 from drive power block unit 18. Motor input voltages are calculated using DC bus voltage signal 48 and PWM switching signals 56. Signals 50 and motor input voltage signals may be obtained from the AC power output of the motor drive 12, such as by way of wired or wireless sensors that transmit the real-time voltage signals 48 and real-time current signals 50 thereto. Alternatively, motor parameter calculator 46 may receive signals indicating motor speed from a speed sensor or estimator integrated in motor drive 12. Drive control unit 16 may also receive boost voltage signal 36, which is used to produce starting torque to accelerate AC motor 28 from zero speed, and a speed reference signal 52. Based on received signals 36, 48, 50, drive control unit 16 transmits a series of switching signals or switching commands 54 to PWM inverter 26, thereby forming a SVM control scheme.

In operation, drive control unit 16 of motor drive system 10 operates in a default mode/setting upon a start-up or reset of the motor drive 12. Operating at the default setting, drive control unit 16 monitors DC bus voltage signal 48 and current signals 50 from sensors, determines an operating point of existing V/Hz curve block 42 based on DC bus voltage signal 48 and current signals 50 and transmits default switching commands 54 to PWM inverter 26 based on the pre-set operating point. According to one embodiment, drive control unit 16 receives a frequency (or speed) command from an input device (not shown) in order to generate a frequency command and a voltage magnitude command. The voltage magnitude command is given by a function of the frequency command, typically referred to as a V/Hz curve. Drive control unit 16 generates a three phase voltage command based on the frequency command, which is used to control switching of an array of switches in PWM inverter 26. Specifically, signal generator 44 receives a voltage command 56 and a frequency command 58 from existing V/Hz curve 42 and generates six PWM signals to control six corresponding switches in PWM inverter 26. In other words, motor drive system 10 transmits voltage-frequency commands according to the static pre-set V/Hz profile in default mode.

Upon an initial operation in default mode, drive control unit 16 then transitions to operate in an energy-optimizing mode wherein control algorithm module 40 bypasses existing V/Hz curve block 42 and receives frequency reference 34, boost voltage signal 36, and NPI 38 from drive user interface 30 as inputs. Control algorithm module 40 also receives estimated or calculated motor parameters 60 from motor parameter calculator 46. In the energy-optimizing mode, control algorithm module 40 uses the received DC bus voltage signal 48 and/or current signals 50 and NPI 38 to calculate or estimate selected reference real-time motor parameters. In one embodiment of the invention, the real-time motor parameters may be an average motor rms voltage, an average motor rms current, an instantaneous motor input power factor, a motor efficiency, or a motor slip (or speed). Control algorithm module 40 then determines if the optimal operation is achieved by determining if any one of the determined real-time motor parameters reaches its pre-defined tolerance zone, as described in more detail with respect to FIG. 4. If the optimal operation is not attained, the algorithm adjusts the voltage command with a fixed or variable step and keeps the same frequency command. Otherwise, the algorithm maintains the same voltage and frequency command until a new frequency reference is detected or an undesirable operation or an unstable motor operation is detected. Control algorithm module 40 transmits the determined voltage command 62 and frequency command 64 to signal generator 44. Using voltage and frequency commands 62, 64 received from control algorithm module 40, signal generator 44 transmits switching signal 54 to drive power block unit 18. Responsive thereto, drive power block unit 18 synthesizes AC voltage waveforms with a fixed frequency and amplitude for delivery to AC motor 28.

In energy-optimizing mode, drive control unit 16 is configured to continuously monitor motor drive system 10 and transmit a series of modified switching commands 54 to PWM inverter 26. Specifically, drive control unit 16 calculates motor input voltages using DC bus voltage signal 48 and PWM switching signals 56 and receives current signals 50 from sensors. Drive control unit 16 calculates or estimates one or more real-time motor parameters from the calculated motor input voltages, current signals 50, and NPI 38. Control module 40 also determines if system instability, an abrupt load change, or an undesirable operation is detected, as described in detail below. Control module 40 further determines whether an optimal operation condition has been reached based on the one or more real-time motor parameters. If control module 40 does not detect an optimal operation condition, system instability, an abrupt load change, or an undesirable operation, control module 40 then generates incremented (or decremented) frequency command 64 and/or incremented voltage (or decremented) command 62 for each execution period and transmits the incremented voltage-frequency commands 62, 64 to signal generator 44. For example, control module 40 may increment (or decrement) only one command 62, 64, for example frequency command 64, while maintaining the previous voltage command 62, and transmit incremented frequency command 64 and non-incremented voltage command 62 to signal generator 44. Alternatively, control module 40 may increment (or decrement) both frequency command 64 and voltage command 62 and transmit both incremented commands 62, 64 to signal generator 44. Using the incremented (or decremented) voltage-frequency commands, signal generator 44 modifies switching commands 54 transmitted to PWM inverter 26 such that the real power input to AC motor 28 in energy-optimizing mode is lower than the real power input using the original static V/Hz curve setting in default mode.

According to an exemplary embodiment, the pre-defined tolerance zone of a motor reference parameter is defined as a small range around a pre-defined value, such as, for example, its maximum and minimum value, its rated or nominal value, or any specific value defined by the user. The trend of this real-time motor parameter is monitored to determine if the real-time value of this motor reference parameter falls within its pre-defined tolerance zone, e.g., if the real-time value of this motor parameter is close enough to its maximum or minimum value. If the algorithm determines that the motor parameter is within its tolerance zone, then optimal operation is attained. The algorithm maintains the same voltage and frequency commands until a new frequency reference or an unstable motor operation or an undesirable operation is detected. According to this optimally maintained voltage-frequency command, the signal generator 44 is caused to generate corresponding switching commands 54 (i.e., a SVM control command) to cause the motor drive to operate at an optimal operation point at which real power input to AC motor 28 is most efficiently utilized.

In energy-optimizing mode, drive control unit 16 is also configured to continuously monitor for an abrupt load change, system instability, and/or undesirable operation. If system instability and/or undesirable operation is confirmed, drive control unit 16 transmits a series of modified switching commands switching commands 54 to PWM inverter 26. During energy-optimizing mode, the system may become unstable due to, for example, abrupt changes in the load or if motor slip (or speed) goes beyond a slip (or speed) boundary. A system instability condition may be determined by monitoring for abrupt changes in the value or rate-of-change of motor current, power factor, or speed (or slip) signals or by monitoring the trend of real-time motor parameter(s), as discussed in detail below. By comparing the real-time motor parameter(s) and the ascertained trend of the real-time motor parameter(s) with their pre-defined boundaries, control module 40 determines if system instability or an undesirable operation is detected. If such system instability or an undesirable operation is detected, control module 40 may transmit modified voltage-frequency commands to signal generator 44 to attempt to regain system stability. Alternatively, control module 40 may enters a "master reset routine" to reset control of motor drive to the default mode within one or more execution periods and increment (or decrement) voltage command 62 to the original pre-set V/Hz curve or linear V/Hz curve, while transmitting the same frequency command 64 to signal generator 44 to reacquire and maintain system stability until the operating point of the load is considered stable. According to one embodiment, frequency command 64 may be held constant until a user or an external process controller demands a change in frequency reference 34.

Drive control unit 16 may also monitor real-time motor parameters for application-specific boundary conditions, which may be pre-set by an operator to indicate a real-time system condition that may not indicate an unstable or undesirable system condition, but nonetheless be undesirable for the specific application. For example, drive control unit 16 may monitor for a minimum voltage boundary, a maximum voltage boundary, a maximum current boundary, a maximum slip (minimum speed) boundary, a minimum power factor boundary, a maximum torque boundary, or a maximum motor temperature boundary.

During energy-optimizing mode, however, a reduced voltage command may cause a decrease in motor speed. Therefore, drive control unit 16 may be further programmed to monitor motor speed and increase the frequency command 64 such that the motor operates at the desired speed while operating in energy-optimizing mode according to a "slip compensation mode" such that a motor shaft speed is held constant at the synchronous speed of the frequency reference $f_{ref}$ 34. Beneficially, the V/Hz curve (either linear, quadratic, or other similar settings (e.g., a flux minimization setting)) can thus be adjusted to optimize the V/Hz ratio so that minimal torque is developed in the motor to meet a load torque demand, as compared to a pre-set V/Hz curve where the torque developed is constant.

Figure 6:
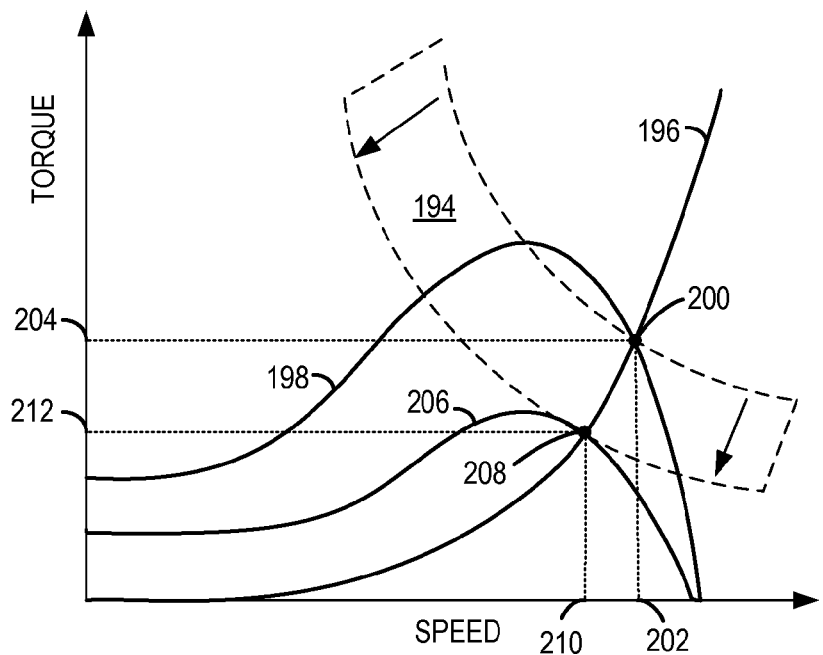
FIG. 6 is an exemplary graph illustrating energy savings for a given motor drive operated according to the motor drive control technique of FIG. 4 according to an embodiment of the invention.

Assuming the actual motor fundamental frequency $f_1$ closely matches the drive frequency command $f_{cmd}$ 64 (i.e., $f_1 = f_{cmd}$), the motor synchronous speed $\omega_{syn}$ can be calculated according to:

$$\omega_{syn} = \frac{120 \times f_1}{p} = \frac{120 \times f_{cmd}}{p}, \quad \text{(Eqn. 1)}$$

where p is the number of poles of motor 28. As shown in FIG. 6, due to the actual loading condition of the load (i.e., the shape of the load characteristic curve), the actual motor shaft speed $\omega_r$ when the drive frequency command 64 is $f_{cmd}$ (thus the motor fundamental frequency is $f_1 = f_{cmd}$) is always slightly lower than the synchronous speed $\omega_{syn}$. The percentage difference between the synchronous speed $\omega_{syn}$ and motor shaft speed is defined according to:

$$s = \frac{\omega_{syn} - \omega_r}{\omega_{syn}}, \quad \text{(Eqn. 2)}$$

where s is motor slip. Therefore, in order to compensate the speed drop due to load, the drive frequency command 64 can be set slightly higher than frequency reference 34 so that the actual motor shaft speed equals to the synchronous speed of the original frequency reference 34. This is the "slip compensation mode."

The slip compensation mode may be used when the user or drive outer-loop controller expects the motor shaft speed to match the synchronous speed of the frequency reference 34 (in this case, frequency reference 34 is given as essentially a "speed reference.") For example, for a 4-pole induction motor, when a user sets frequency reference 34 at 40 Hz in the drive user interface, the user often expects the motor to operate at the synchronous speed of 40 Hz (i.e., 2400 rpm). However, if the drive sends a frequency command 62 of 40 Hz, the actual motor speed will be slightly lower than 2400 rpm due to actual loading condition (according to FIG. 6), for instance, at 2375 rpm. Using Eqn. 2, the slip of the motor may be calculated as $$\left(\frac{2400 - 2375}{2400}\right).$$

In order to operate the motor at a user expected 2400 rpm, the drive sends a frequency command 62, which slightly greater than the frequency reference 34 of 40 Hz, for example 40.2 Hz. Under this higher frequency the motor shaft speed is 2400 rpm that matches the user's "speed reference."

Still referring to FIG. 1, during energy-optimizing mode existing V/Hz curve block 42 may be dealt with in several ways according to embodiments of the invention. According to one embodiment, control algorithm module 40 may be implemented in drive application software, while the existing V/Hz curve block 42 may be implemented in drive firmware. In such an embodiment, existing V/Hz curve block 42 may continue to produce voltage and frequency commands, but such commands may not pass to signal generator 44. Alternatively, both control algorithm module 40 and existing V/Hz curve block 42 may be implemented in drive firmware. In this case, existing V/Hz curve block 42 may be disabled or removed.

Figure 2:
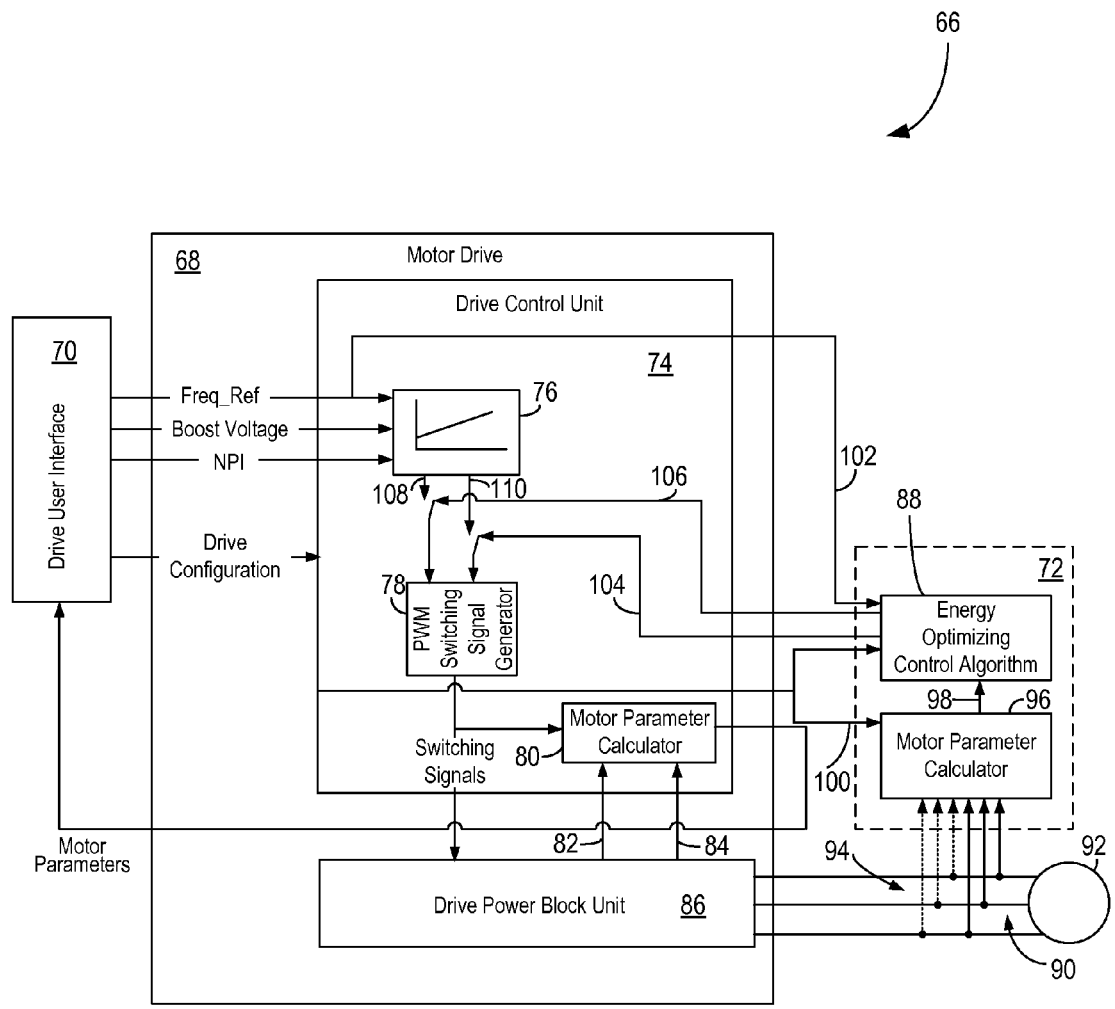
FIG. 2 is a schematic of a control system including a motor drive system according to another aspect of the invention.

Referring now to FIG. 2, the general structure of a motor drive system 66 is shown according to an embodiment of the invention. Motor drive system 66 includes an AC motor drive 68, a drive user interface 70, and a standalone external control module 72. A drive control unit 74 included within motor drive system 66 comprises a static V/Hz curve block 76, a signal generator 78, and a motor parameter calculator 80, which receives DC bus voltage signal 82 and motor current signals 84 from a drive power block unit 86.

Control module 72 includes an energy control algorithm module 88 as a separate hardware module external to the existing hardware of motor drive 68 and may be installed in an existing motor drive and exchange data through existing drive communications, such as, for example, ModBus, DeviceNet, Ethernet, and the like. Control module 72 uses a set of voltage sensors 90 to measure the three phase line-to-line voltages of a motor 92. Control module 72 also includes a set of current sensors 94 to measure the three phase currents of motor 92. Where no neutral point is available, control module 72 includes at least two current sensors for a three-wire system. As the three phase currents add to zero, the third current may be calculated from the other two current values. However, while a third sensor is optional, such sensor increases the accuracy of the overall current calculation.

Control module 72 also includes an internal motor parameters calculator 96, which calculates/estimates a set of reference motor parameters 98, such as, for example, rms voltage, rms current, slip (or speed), power factor, and efficiency, to be input to control algorithm module 88. Motor nameplate information (NPI) 100 is obtained from motor drive 68 through communications or inputted by a user in control module 72. A frequency reference 102 is also input to external control module 72 through drive communications.

Similar to the procedure described with respect to FIG. 1, during an energy-optimizing mode, the logic contained in control algorithm module 88 essentially replaces static V/Hz curve block 76. Control algorithm module 88 receives frequency reference 102 and NPI 100 from motor drive 68, as well as calculated/estimated reference motor parameters 98 from motor parameters calculator 96 as inputs. Module 88 generates a frequency command 104 and a voltage command 106 using these inputs and control module 72 sends these commands 104, 106 to signal generator 78.

According to this embodiment, since control algorithm module 88 is located externally from motor drive 68, static V/Hz curve block 76 may be kept as is, producing a set of preset voltage commands 108 and frequency commands 110. However, these preset commands 108, 110 are not passed to signal generator 78.

Figure 3:
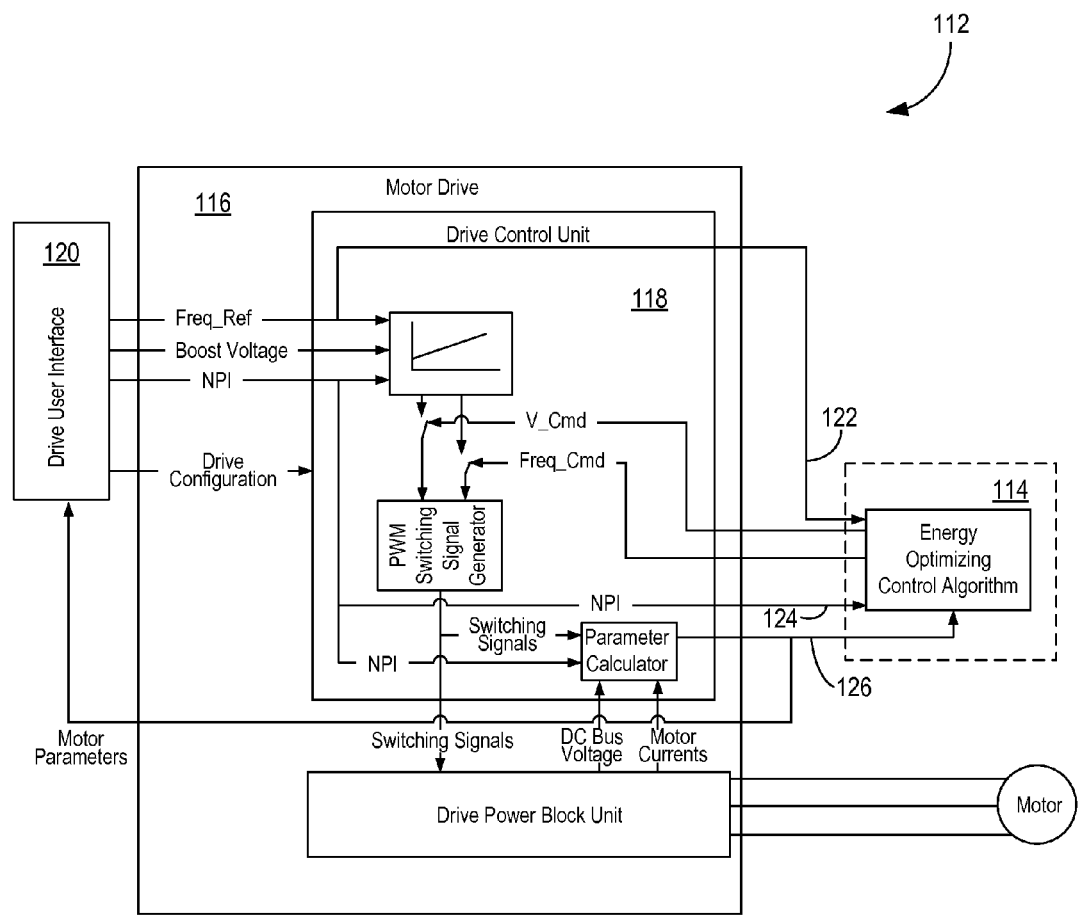
FIG. 3 is a schematic of a control system including a motor drive system according to yet another aspect of the invention.

FIG. 3 illustrates a motor drive system 112 including an external control module 114 according to another embodiment of the invention. Similar to the motor drive system described with respect to FIG. 2, motor drive system 112 includes a motor drive 116, a drive control unit 118, and a drive user interface 120. However, unlike the motor drive system of FIG. 2, external module 114 does not have its own voltage and current sensors or an internal motor parameter calculator. Instead, external module 114 obtains a frequency reference 122, a NPI 124, and calculated and/or estimated motor parameters 126 through drive communications. According to one embodiment, external module 114 may be implemented in an extension card slot of motor drive 116 to provide energy optimizing functionality to motor drive 116.

Figure 4:
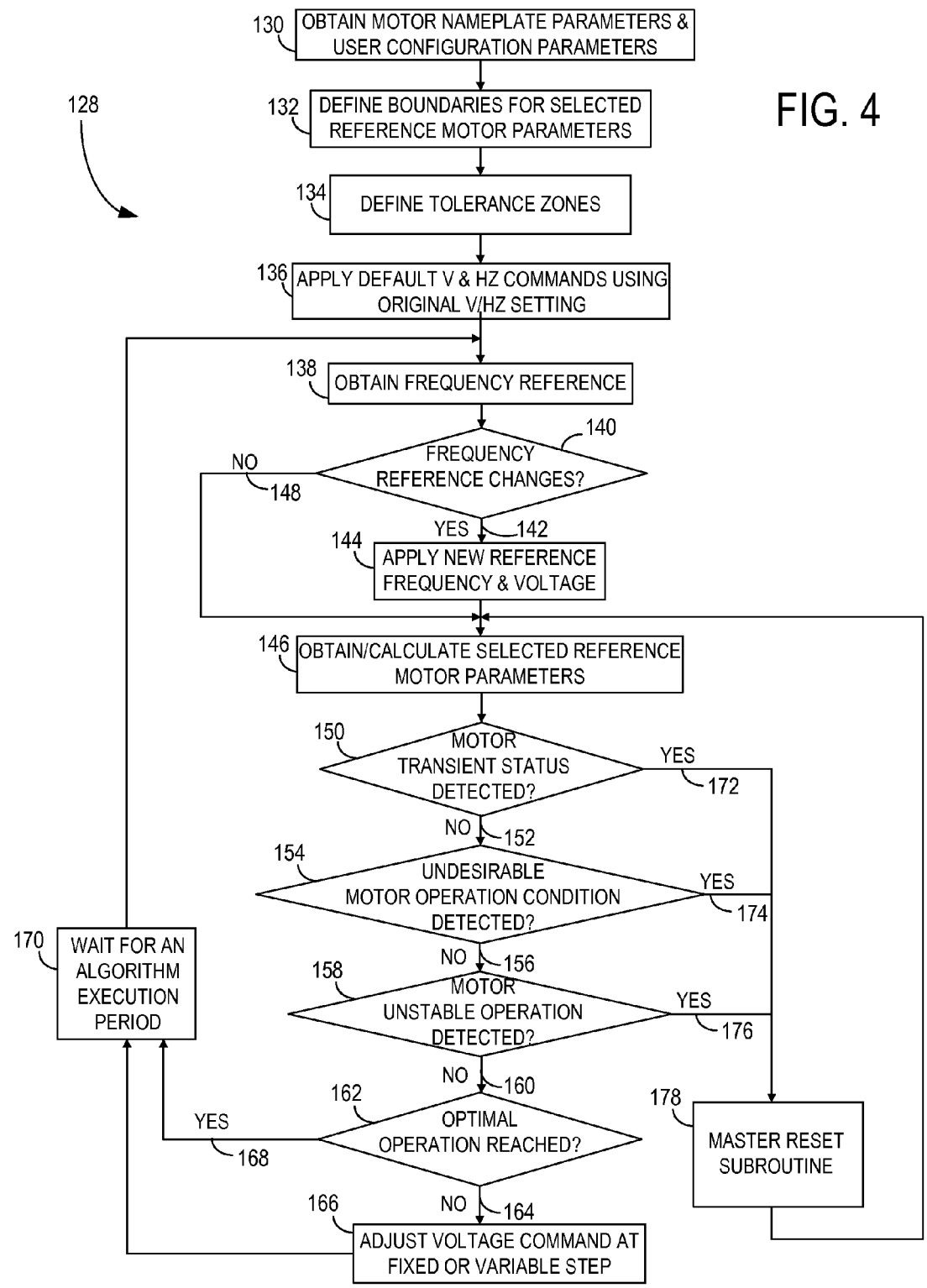
FIG. 4 is a flow chart setting forth exemplary steps of a motor drive control technique that may be implemented in any of the motor drive systems of FIGS. 1-3 according to embodiments of the invention.

Referring now to FIG. 4, a controller implemented, energy-optimizing technique 128 for dynamically controlling a motor drive, such as AC motor drive 12 of FIG. 1, is set forth according to an embodiment of the invention. As described in detail below, technique 128 dynamically adjusts voltage and frequency applied to the motor based on motor or load demand, which effectively adjusts the shape or profile of the pre-set V/Hz curve internal to motor drive 12. Technique 128 monitors the value of one or more motor parameters until the motor parameter(s) fall within a pre-defined tolerance zone. While adjusting voltage and frequency, technique 128 also monitors for abrupt load changes or motor instabilities or undesirable operations, which may signify potential motor failure or undesirable motor operation.

Technique 128 begins at BLOCK 130 by obtaining motor nameplate parameters (NPI), such as, for example, rated horse power (HP), full load amperes (FLA), rated voltage, rated speed (RPM), rated frequency (Hz), rated power factor, and rated efficiency. At BLOCK 130, user configuration parameters are also obtained, which may include a given percentage of FLA, a user-defined slip boundary, for example. At BLOCK 132, technique 128 defines a set of boundaries for selected reference motor parameters, including, for example, voltage, current, speed (slip), power factor, and efficiency. For example, a voltage boundary condition, V_bound, may be defined as a percentage of a quadratic V/Hz curve (e.g., 80%); a current boundary, I_bound, may be defined as a percentage of FLA; a slip boundary, s_bound, may be defined to correspond to a rated slip at a rated frequency or be user-defined; and a maximum change in current, delta_I_bound, may be defined as a percentage of FLA (e.g., 20%).

At BLOCK 134, a set of tolerance zones are defined for selected motor parameters for determining optimal operation. Such tolerance zones may include a voltage tolerance zone, a current tolerance zone, a speed (slip) tolerance zone, a power factor tolerance zone, and/or an efficiency tolerance zone, for example. According to an embodiment of the invention, a tolerance zone may be determined based on a defined boundary condition according to:

$$\text{Tolerance\_Zone} = x * \text{Boundary\_Condition} \quad \text{(Eqn. 3)},$$

where x represents a selected percentage range. Using Eqn. 1, a voltage tolerance zone may be defined as V_tol_zone=[100%-105%]*V_bound, for example. Likewise, a current tolerance zone, I_tol_zone and a slip tolerance zone, s_tol_zone, may be defined as I_tol_zone=[95%-100%]*I_bound and s_tol_zone=[95%-100%]*s_bound, respectively.

At BLOCK 136, technique 128 supplies an initial, default, or start-up set of voltage-frequency commands to a command generator. Default or start-up set of voltage-frequency commands may be, for example, based on voltage-frequency commands of a pre-set or static V/Hz curve or saved voltage-frequency commands from a previous successful start-up event.

Technique 128 obtains a frequency reference from a user or an outer loop process controller of the motor drive at BLOCK 138. At BLOCK 140, technique 128 determines if the change of frequency reference is significant enough for the drive control to respond. Specifically, technique 128 may compare a current frequency reference to a previous frequency reference value to determine if the current frequency reference is identical to the previous frequency reference. Alternatively, technique 128 may determine if the difference between the two values is greater than a preset tolerance value (e.g., 0.1 Hz). If the frequency reference is changed (or the change is greater than the preset tolerance value) 142, technique 128 applies a new reference frequency and a new voltage from the original V/Hz setting, a linear V/Hz setting, or other pre-defined value/setting at this frequency as frequency and voltage commands at BLOCK 144. Alternatively, if the frequency reference has changed by a small amount (e.g., <0.1 Hz) the voltage command may remain unchanged while changing the frequency command. Technique 128 then proceeds to BLOCK 146 and calculates or estimates one or more real-time motor parameters, which may correspond to a motor voltage, a motor current, a motor speed, a motor power factor, and/or a motor efficiency, for example.

Referring back to BLOCK 140, if the frequency reference is unchanged (or the change is less than a preset tolerance value) 148, technique 128 proceeds directly to BLOCK 146 and calculates or estimates real-time motor parameters using a current set of voltage and frequency commands. At BLOCK 150, technique 128 monitors for a motor transient status, such as, for example, an abrupt load change. If no transient status is detected 152, technique 128 monitors for an undesirable motor operation condition at BLOCK 154, which may be a detected motor current beyond a current boundary or a detected motor voltage beyond a voltage boundary, for example. If no undesirable motor operation condition is detected 156, technique 128 monitors for an unstable operation condition at BLOCK 158. To determine if an unstable operating condition exists, technique 128 may analyze the monitored real-time line voltage and current, a change in value between reference line voltage and/or current and real-time line voltage and/or current measurements, one or more real-time motor parameters values, and/or the motor parameter trend to determine an unstable operation condition. An unstable operation condition may be detected if a motor slip (or speed) is beyond a slip (or speed) boundary, for example. Also, an unstable operation condition may be reflected by an abrupt change in line voltage or current, an abrupt change in a motor parameter, or by the value of the real-time motor parameter, such as, for example, a motor temperature, torque, slip, power factor, or efficiency outside a threshold.

If an unstable operation condition is not detected 160, technique 128 determines if optimal operation is reached at BLOCK 162 by determining if any one of the selected reference parameters is within its defined tolerance zone, as defined at BLOCK 136. If no selected reference parameter is within its defined tolerance zone 164, technique 128 adjusts the voltage command at a fixed or variable step at BLOCK 166. For example, technique 128 may reduce the voltage command by a preset pulse value, thereby causing a modified switching signal to be transmitted to the inverter. In one embodiment, the technique 128 increments the voltage command by a pulse value of −10 volts. That is, the modified voltage command is 10 volts lower than the default voltage command. Alternatively, if the motor drive is operating at an optimal operation point 168 (i.e., a motor parameter is within its tolerance zone), technique 128 maintains the current voltage command and frequency command. At BLOCK 170, technique 128 enters a wait step, wherein technique 128 waits for an algorithm execution period before returning to BLOCK 138. Technique 128 then continues cycling through BLOCKS 138 and 178 to monitor for changes in motor status.

Referring back to BLOCKS 150, 154, and 158, if technique 128 detects any one of a motor transient status 172, an undesirable motor operation condition 174, or an unstable motor operation condition 176, technique 128 enters a master reset subroutine at BLOCK 178. During the master reset subroutine, the frequency command remains unchanged and within a few steps (i.e., algorithm fast execution periods), the voltage command is increased to a linear V/Hz setting or an original V/Hz setting. Alternatively, master reset subroutine may selectively increment the voltage-frequency command to reach the stable condition by backtracking to the last stable condition or attempting to correct the overshoot by decreasing the previously used increment or pulse value of the voltage-frequency command. For example, if the previous pulse value was −10 volts, technique 128 may increase the previously incremented voltage-frequency command by +5 volts to reach a stable point between the two most recent increments of the voltage-frequency command. Once a stable condition is achieved, technique returns to BLOCK 138.

According to one embodiment, preset execution periods may be assigned to each step of technique 128. For example, each of BLOCKS 138-178 may be assigned to one of a fast execution period, T_fast, used for monitor, protection, and master reset (e.g., 0.5 seconds) and a slow execution period, T_slow, used for a drive command update period to update the operation of the drive and motor (e.g., 10 seconds). It is contemplated that a default value for T_fast and T_slow may vary depending on the time constant of the motor and load.

Figure 5:
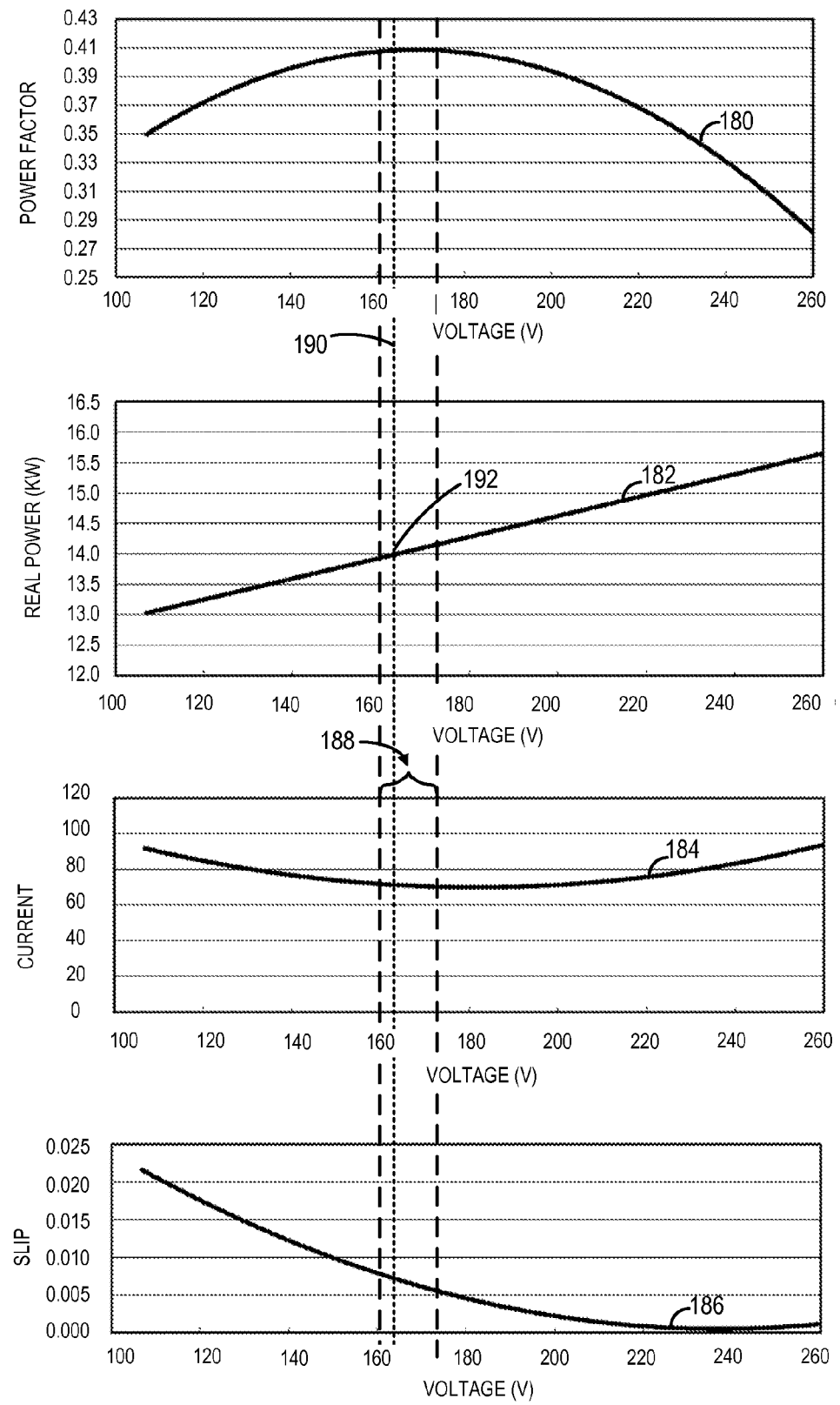
FIG. 5 is a series of exemplary graphs of real-time motor parameters for the motor drive control technique of FIG. 4.

FIG. 5 shows a series of graphs of real-time motor parameters determined using a control technique such as that described with respect to FIGS. 1-4 for a motor having a rated power of approximately 125 hp, which corresponds to a full voltage of approximately 268.4 V of a static and pre-set linear V/Hz curve with a 35 Hz frequency command. FIG. 5 illustrates motor power factor 180, input real power 182, motor current 184, and motor slip 186 as a function of voltage. As shown, input real power 182 follows an approximately linear path as voltage is decreased from rated power while keeping the frequency command constant at 35 Hz. Motor power factor 180, however, follows an approximately quadratic curve. A tolerance zone 188 is defined corresponding to a desired range for a motor parameter, such as, for example, current. As shown in FIG. 5, at a given operation point 190 within tolerance zone 188 the motor input real power 182 is reduced to an optimal operating power 192 of approximately 14 kW by reducing voltage from full voltage of the pre-set V/Hz curve to a voltage of 168 V corresponding to operation point 190. Thus, by decreasing voltage to reach operating point 190, real power 182 is reduced.

While additional energy savings may be possible by reducing the voltage to an operation point outside tolerance zone 188, such a decrease may have negative effects on motor stability if voltage is reduced too much. As shown in FIG. 5, at voltage values less than approximately 168 V, slip 186 increases rapidly. A slip 186 greater than approximately 3% may be undesirable and can cause motor instability. Therefore, tolerance zone 188 may be selected as an optimal operating point since it ensures that slip 186 stays below the pre-defined slip boundary of 3%. Also, at voltages beyond tolerance zone 188, current 182 increases as well, potentially leading to an over-current condition.

FIG. 6 illustrates real-time energy savings 194 achieved using the dynamic energy-optimizing control strategy set forth with respect to FIG. 4. Load characteristic curve 196 is a characteristic torque/speed curve that describes a certain load, such as, for example, a pump. Curve 198 is a torque/speed curve of a traditional motor drive operated at an operating point with a given frequency command $f_{cmd}$ according to a static and pre-set V/Hz curve. According to one embodiment, frequency command $f_{cmd}$ may be equal to a frequency reference $f_{ref}$ which is typically given to the drive by the user or an outer-loop controller. The drive controls the motor to have an actual fundamental frequency of $f_1$ that closely tracks the frequency command $f_{cmd}$. The actual fundamental frequency $f_1$ in the motor determines the motor synchronous speed $\omega_{syn}$ by:

$$\omega_{syn} = \frac{120 f_1}{p}, \quad \text{(Eqn. 4)}$$

where p is the number of poles. Synchronous speed is a constant value for a certain motor at a fixed frequency. It is an imaginary maximum possible speed that the motor could reach under absolute no-load conditions, or when torque is zero.) The intersection point 200 between curve 196 and curve 198 determines the actual operating point of the motor under this condition, with a motor speed $\omega_1$ 202 and an output torque $T_1$ 204.

Curve 206 is a torque/speed curve of an optimized motor drive operated within a tolerance zone at an operating point with the same frequency command $f_{cmd}$ (as results, same actual frequency $f_1$ and synchronous speed $\omega_{syn}$), such as operating point 188 of FIG. 5. The intersection point 208 between curve 206 and curve 196 determines the actual operating point of the motor under this optimal operating condition, with a motor speed $\omega_2$ 210 and an output torque $T_2$ 212.

As shown in FIG. 6, at a given frequency command $f_{cmd}$, the traditional motor drive operates at torque 204. The optimized motor drive, on the other hand, operates at a lower torque 212. This decrease in torque from operation point 200 to operation point 208 results in reduced input power 194 and therefore energy savings. It is noticeable that as the optimizing control is applied, the actual motor speed typically drops slightly depending on the torque/speed characteristic curve of a specific load. This is typically acceptable for applications where precise speed control is not needed, such as pump, compressors, and fans.

According to one embodiment of the invention, energy savings 194 may be calculated based on a comparison of the initial voltage-frequency command and the modified voltage-frequency command corresponding to operation within the tolerance zone of the motor parameter, and displayed as a digital power savings value on a motor drive, such as motor drive 12 of FIG. 1, for example. The displayed energy savings may indicate either an instantaneous energy savings and/or a cumulative energy savings over a pre-set time period or during the lifetime of the drive. Also, energy savings 194 may be used to calculate a carbon reduction resulting from the decreased energy usage, which may be displayed on a carbon reduction meter on motor drive 12.

Figure 7:
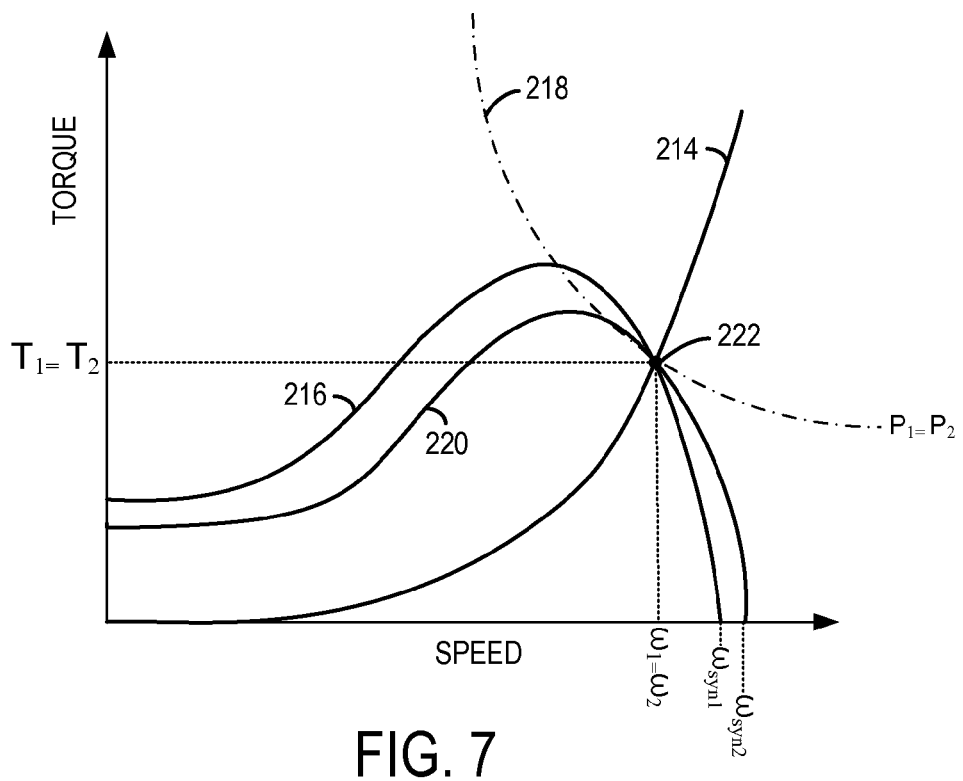
FIG. 7 is an exemplary graph illustrating energy savings for a given motor drive operated according to the motor drive control technique of FIG. 4 according to an embodiment of the invention.

Referring now to FIG. 7, an optimized torque speed curve is illustrated for applications where precise speed control is desired according to an embodiment of the invention. Load characteristic curve 214 is a characteristic torque/speed curve that describes a certain load, such as, for example, a pump. A first motor characteristic curve 216 represents a torque/speed curve of a traditional motor drive operated at an operating point with a given frequency command $f_{cmd}$ according to a static and pre-set V/Hz curve 218. A second motor characteristic curve 220 is a torque/speed curve of an optimized motor drive. As shown in FIG. 7, curves 216, 220 intersect load characteristic curve 214 at an intersection point 222 having a common speed and torque.

This intersection point 222 is a result of operating a motor drive in an application where precise speed control is desired. In such an application, an outer-loop process controller is typically included to adjust the frequency command and, together with energy optimizing control method described with respect to FIG. 4, settle the motor operating point to the intersection point 222 of curves 214 and 218. In this example, the outer-loop controller will slightly increase the frequency command $f_{cmd}$ so that it is slightly greater than the frequency reference $f_{ref}$ (in turn, the synchronous speed, from $\omega_{syn1}$ to $\omega_{syn2}$) and eventually settle down to the original operating point at speed $\omega_1$ and output torque $T_1$. The output power P2 will be equal to the original output power P1.

However, because the second motor characteristic curve 220 is associated with lower voltage applied to the motor, the motor core losses will be reduced. Therefore, energy saving are achieved from the motor core loss reduction at a reduced voltage. A stable operation is achievable with the interactions between the energy-optimizing algorithm and the external process controller, because in this system, the outer-loop process control time constant (in tens of seconds or minutes) is at least 10 times faster than the time constant of the energy-optimizing algorithm (in seconds).

Figure 8:
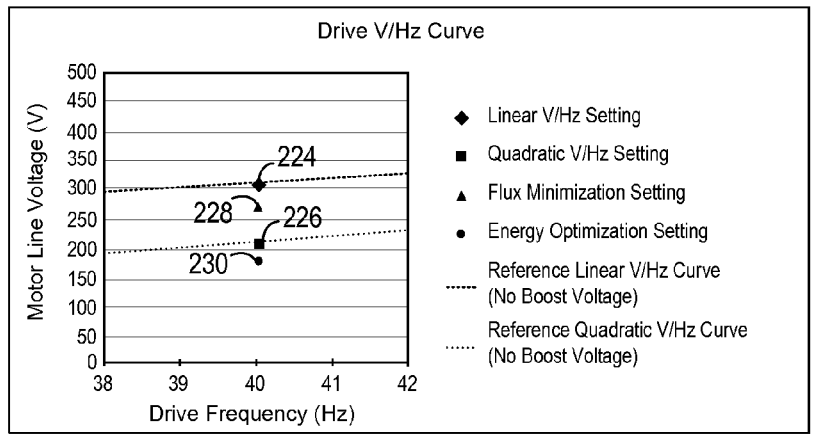
FIGS. 8-10 are a series of exemplary graphs illustrating a comparison of a number of motor drive control techniques.
Figure 9:
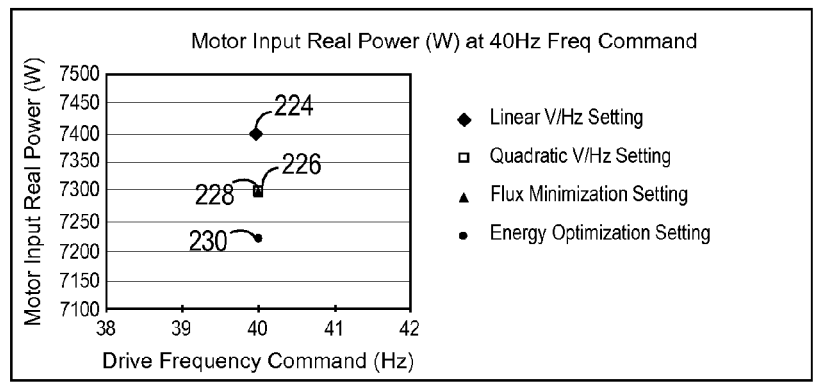
Figure 10:
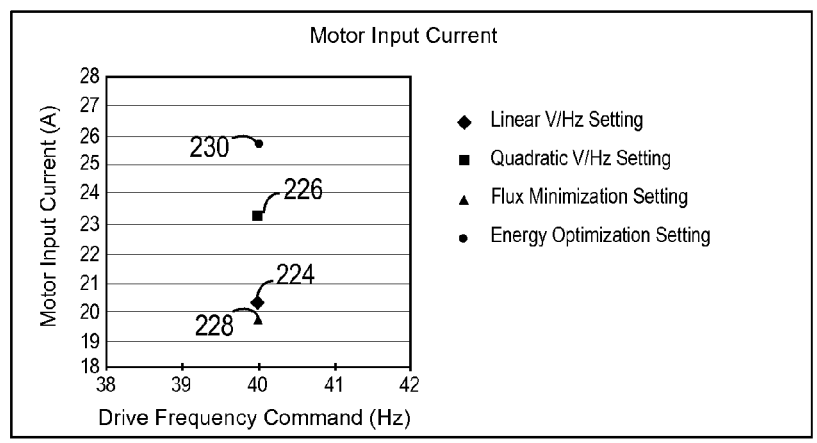

FIGS. 8-10 show a comparison of motor voltage (FIG. 8), motor input current (FIG. 9), and motor input real power (FIG. 10) measured under four different motor drive control conditions using a 50 hp open-loop motor drive at 40 Hz operation: a Linear V/Hz setting 224; a Quadratic V/Hz setting 226; a Flux Minimization setting 228; and an energy optimization setting 230, such as that described with respect to FIG. 4. As shown in FIGS. 8-10, the Flux Minimization setting 228 gives the minimal current and the energy optimization setting 230 gives the minimal input real power, which leads to maximum energy savings.

Figure 11:
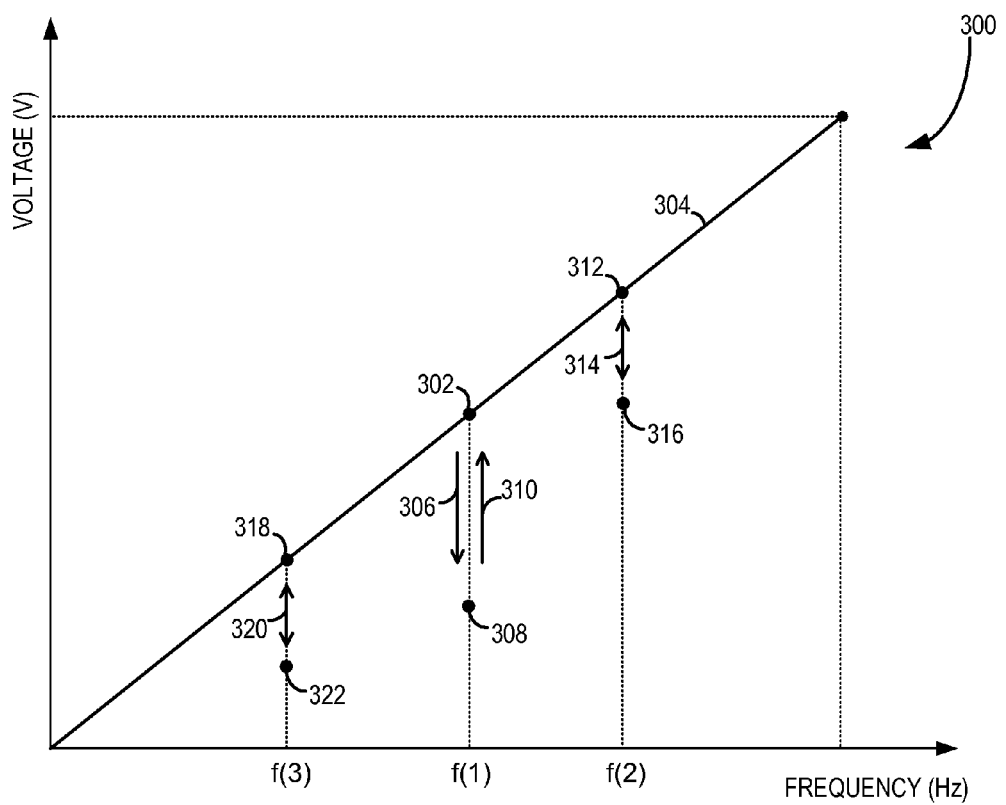
FIG. 11 is a graph illustrating an exemplary initial linear voltage-frequency curve and motor drive operation along a modified voltage-frequency curve for a given motor drive operated according to the motor drive control technique of FIG. 4 according to an embodiment of the invention.

Referring now to FIG. 11, graph 300 is provided to visually depict a motor drive, such as motor drive 12 of FIG. 1, operating according to technique 128 of FIG. 4. Initially, drive operates at point 302 using a default voltage and frequency command defined on an initial voltage-frequency curve 304. While curve 304 is illustrated as being linear, one skilled in the art will recognize that initial voltage-frequency curve 304 may be a squared curve or any static, predefined curve. From point 302, the voltage reference incrementally decreases in the direction of arrow 306 until reaching an optimal operation point at point 308, as described with respect to BLOCKS 138-178 of technique 128.

If the motor drive receives a new speed reference command to increase the frequency to f(2) while operating at point 308, the frequency reference is temporarily held at f(1) as the voltage reference is incrementally stepped back up to point 302 on the initial voltage-frequency curve 304 in the direction of arrow 310. Once the voltage reference reaches point 302, both the voltage and frequency references are increased along voltage-frequency curve 304 until the frequency reference reaches f(2) at point 312. When the motor reaches steady speed operation at f(2), the voltage reference is incrementally adjusted in the direction of arrows 314 as needed in response to load changes and until reaching an optimal operation point at point 316, in a similar manner as described above with respect to movement from point 302 to point 304.

If a decrease in speed from f(2) to f(3) is desired, a similar procedure is followed. Starting at point 316, the voltage reference is incrementally increased to point 312 on curve 304 before the speed request to the drive is changed. Once the voltage reference reaches point 312, the voltage and frequency references decrease following curve 304 until the frequency reference reaches f(3) at point 318. Once at point 318, the voltage reference is incremented as needed in response to load changes the direction of arrows 320 until an optimal operation point is reached at point 322.

Figure 12:
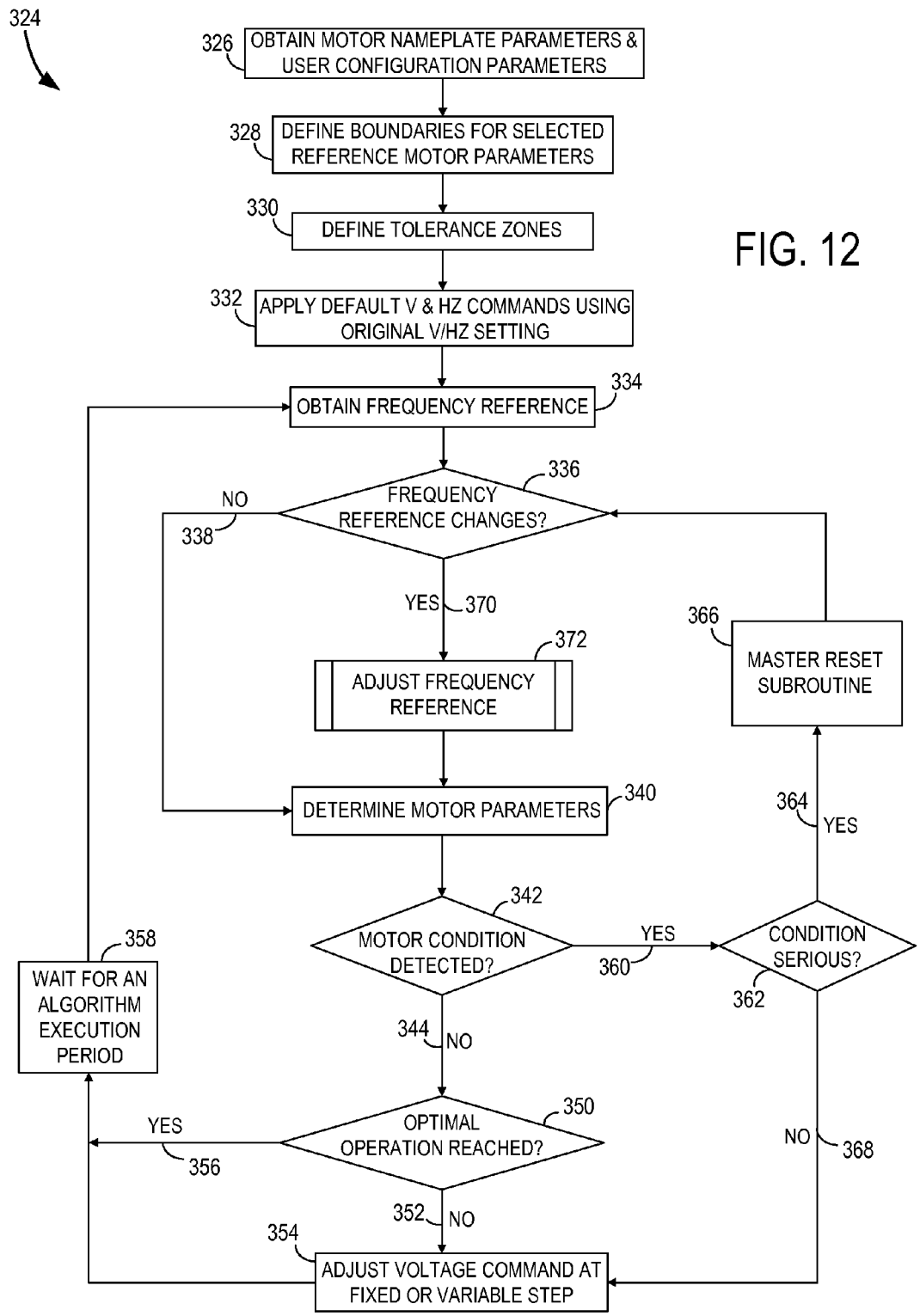
FIG. 12 is a flow chart setting forth exemplary steps of an alternative motor drive control technique that may be implemented in any of the motor drive systems of FIGS. 1-3 according to embodiments of the invention.

Referring now to FIG. 12, a controller implemented, energy-optimizing technique 324 for dynamically controlling a motor drive, such as AC motor drive 12 of FIG. 1, is set forth according to an alternative embodiment of the invention. As described in detail below, technique 324 dynamically adjusts voltage and frequency applied to the motor based on motor or load demand and in response to changes in the speed or frequency reference commands. The dynamic adjustment accomplished by technique 324 effectively adjusts the shape or profile of the pre-set V/Hz curve internal to motor drive 12.

Similar to technique 128 (FIG. 4), during constant speed operation, technique 324 monitors the value of one or more motor parameters until the motor parameter(s) fall within a pre-defined tolerance zone. While adjusting voltage and frequency, technique 324 also monitors for abrupt load changes or motor instabilities or undesirable operations, which may signify potential motor failure or undesirable motor operation. During periods of changing speed, technique 324 the drive follows a dynamic V/Hz curve until the motor reaches steady-speed operation, as described in detail below.

Technique 324 begins at BLOCK 326 by obtaining motor nameplate parameters (NPI), such as, for example, rated horse power (HP), full load amperes (FLA), rated voltage, rated speed (RPM), rated frequency (Hz), rated power factor, and rated efficiency. At BLOCK 326, user configuration parameters are also obtained, which may include a given percentage of FLA, a user-defined slip boundary, for example. At BLOCK 328, technique 324 defines a set of boundaries for selected reference motor parameters, including, for example, voltage, current, speed (slip), power factor, and efficiency. For example, a voltage boundary condition, V_bound, may be defined as a percentage of a quadratic V/Hz curve (e.g., 80%); a current boundary, I_bound, may be defined as a percentage of FLA; a slip boundary, s_bound, may be defined to correspond to a rated slip at a rated frequency or be user-defined; and a maximum change in current, delta_I_bound, may be defined as a percentage of FLA (e.g., 20%).

At BLOCK 330, a set of tolerance zones are defined for selected motor parameters for determining optimal operation. Such tolerance zones may include a voltage tolerance zone, a current tolerance zone, a speed (slip) tolerance zone, a power factor tolerance zone, and/or an efficiency tolerance zone, for example. According to an embodiment of the invention, tolerance zones may be determined in a similar manner as described above with respect to BLOCK 134 (FIG. 4).

At BLOCK 332, technique 324 supplies an initial, default, or start-up set of voltage-frequency commands to a command generator. Default or start-up set of voltage-frequency commands may be, for example, based on voltage-frequency commands of a pre-set or static V/Hz curve or saved voltage-frequency commands from a previous successful start-up event.

Technique 324 obtains a frequency reference from a user or an outer loop process controller of the motor drive at BLOCK 334. At BLOCK 336, technique 324 determines if the change of frequency reference is significant enough for the drive control to respond. Specifically, technique 324 may compare a current speed or frequency reference to a previous frequency reference value to determine if the current frequency reference has changed from the previous frequency reference. Frequency reference changes may occur due to changes in the desired operating speed of the motor. Alternatively, technique 324 may determine if the difference between the two values is greater than a preset tolerance value (e.g., 0.1 Hz).

If the frequency reference has not changed 338 (or the change is less than a preset tolerance value), technique 324 proceeds to BLOCK 340 and calculates or estimates real-time motor parameters using a current set of voltage and frequency commands. At BLOCK 342, technique 324 monitors for a motor condition. The motor condition may include a transient status, such as, for example, an abrupt load change. The motor condition may also include an undesirable motor operation condition, which may be a detected motor current beyond a current boundary or a detected motor voltage beyond a voltage boundary, for example. The motor condition may also include an unstable operation condition that is determined based on analysis of the monitored real-time line voltage and current, a change in value between reference line voltage and/or current and real-time line voltage and/or current measurements, one or more real-time motor parameters values, and/or the motor parameter trend to determine an unstable operation condition. An unstable operation condition may be detected if a motor slip (or speed) is beyond a slip (or speed) boundary, for example. Also, an unstable operation condition may be reflected by an abrupt change in line voltage or current, an abrupt change in a motor parameter, or by the value of the real-time motor parameter, such as, for example, a motor temperature, torque, slip, power factor, or efficiency outside a threshold.

If a motor condition is not detected 344, technique 324 proceeds to BLOCK 350. At BLOCK 350, technique 324 determines whether optimal operation is reached by determining if any one of the selected reference parameters is within its defined tolerance zone, as defined at BLOCK 330. If no selected reference parameter is within its defined tolerance zone 352, technique 324 adjusts the voltage command at a fixed or variable step at BLOCK 354. For example, technique 324 may reduce the voltage command by a preset pulse value, thereby causing a modified switching signal to be transmitted to the inverter. In one embodiment, technique 324 increments the voltage command by a pulse value of −10 volts. That is, the modified voltage command is 10 volts lower than the default voltage command. Alternatively, if the motor drive is operating at an optimal operation point 356 (i.e., a motor parameter is within its tolerance zone), technique 324 maintains the current voltage command and frequency command. At BLOCK 358, technique 324 enters a wait step, wherein technique 324 waits for an algorithm execution period before returning to BLOCK 334. If no frequency reference changes occur and no motor conditions are detected, technique 324 then continues cycling through BLOCKS 336-358 as described above.

Referring back to BLOCK 342, if technique 324 detects a motor condition 360, technique 324 determines whether the condition is serious at BLOCK 362 based on a current value of one or more monitored motor parameters. A serious motor condition may include, as an example, an impending motor fault or failure. If a serious motor condition is detected 364, technique 324 enters a master reset subroutine at BLOCK 366. During the master reset subroutine, the frequency command remains unchanged and within a few steps (i.e., algorithm fast execution periods), the voltage command is increased to a linear V/Hz setting or an original V/Hz setting. Once a stable condition is achieved, technique 324 returns to BLOCK 336.

If technique 324 determines that the detected motor condition is not serious 368, the voltage command is selectively adjusted at BLOCK 354 to reach a stable operating condition by backtracking to the last stable condition or attempting to correct the overshoot by decreasing the previously used increment or pulse value of the voltage-frequency command. For example, if the previous pulse value was −10 volts, technique 324 may increase the previously incremented voltage-frequency command by +5 volts to reach a stable point between the two most recent increments of the voltage-frequency command.

Figure 13:
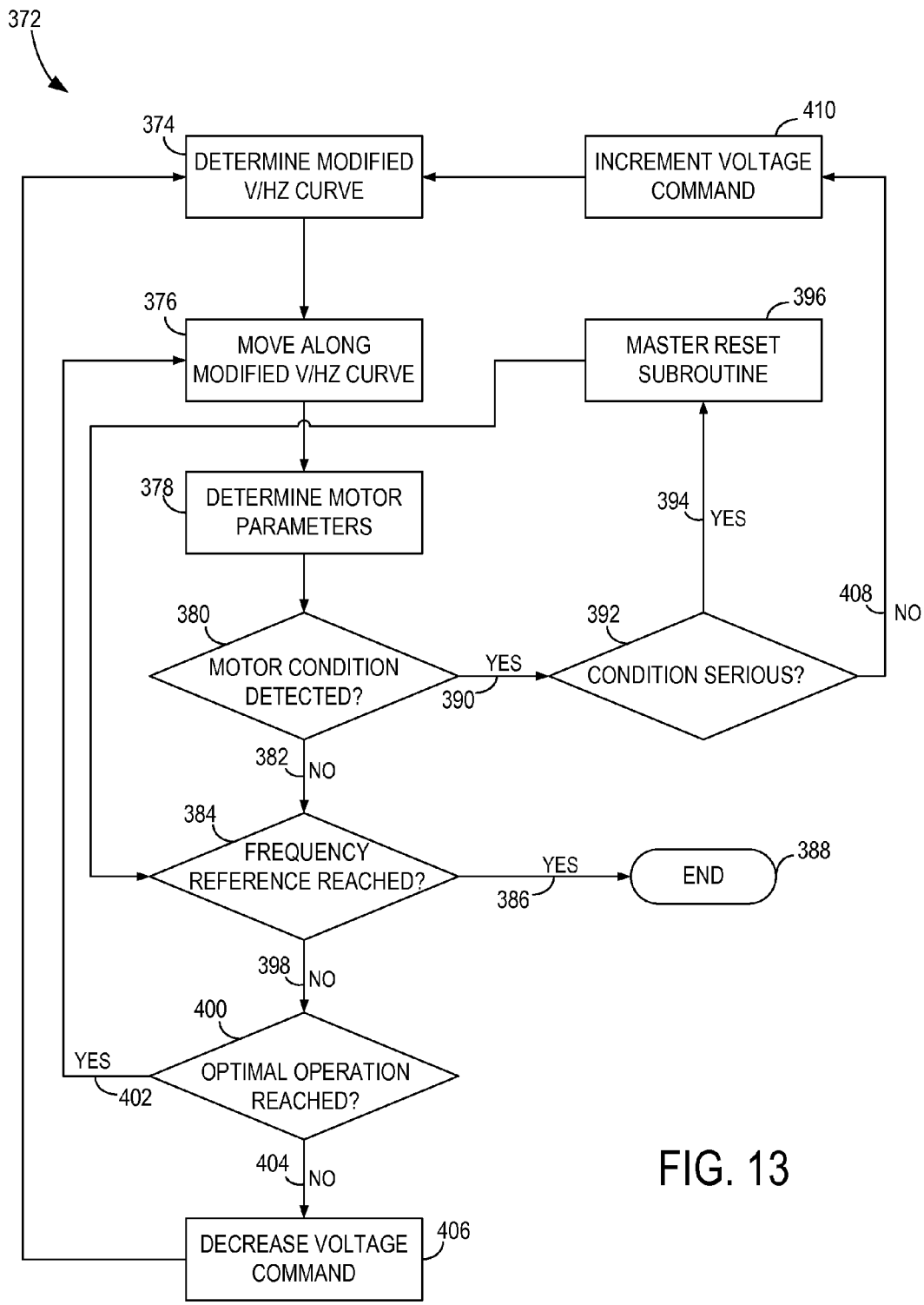
FIG. 13 is a flow chart of a subroutine of the motor drive control technique of FIG. 12 according to an embodiment of the invention.

Referring back to BLOCK 336, if technique 324 determines that the frequency reference has changed 370 since the last iteration of the algorithm, technique 324 proceeds to BLOCK 372 and enters a subroutine wherein the voltage and/or frequency references are selectively incremented, as described in more detail with respect to FIG. 13.

Referring now to FIG. 13, subroutine 372 begins at BLOCK 374 by generating a modified V/Hz curve based on a current voltage and frequency reference command and the initial V/Hz curve. In one embodiment, the modified V/Hz curve is a line defined between the current voltage-frequency command and either the origin 440 of the initial V/Hz curve or the field weakening point 422, as described in more detail with respect to FIG. 14. At BLOCK 376 the voltage and frequency references are incremented to an operating point on the modified V/Hz curve.

After incrementing the frequency and voltage references, technique 324 calculates reference motor parameters at BLOCK 378 and then determines whether a motor condition exists at BLOCK 380 in a similar manner as described with respect to BLOCKS 340, 342 (FIG. 12). If a motor condition is not detected 382, subroutine 372 proceeds to BLOCK 384 and determines whether the desired frequency reference has been reached. If so 386, subroutine 372 ends at BLOCK 388.

Referring back to BLOCK 380, if a motor condition is detected 390, subroutine 372 determines whether the condition is serious at BLOCK 392. If so 394, a master reset subroutine is entered at BLOCK 396, similar to BLOCK 366 (FIG. 12). Following the master reset, subroutine 372 returns to BLOCK 384 to determine if the desired frequency reference has been reached.

If the desired frequency reference has not been reached 398, subroutine 372 determines whether the optimal operation has been attained at BLOCK 400. If so 402, subroutine 372 returns to BLOCK 376 and adjusts the voltage and frequency references in accordance with the modified V/Hz curve.

Referring back to BLOCK 400, if optimal operation has not been reached 404, the voltage reference command is decreased at a fixed or variable step at BLOCK 406. Subroutine 372 then returns to BLOCK 374 and regenerates the V/Hz curve based on the adjusted voltage reference and frequency reference.

Referring back to BLOCK 392, if the detected motor condition is not serious 408, the voltage reference command is incremented at BLOCK 410. Subroutine 372 then returns to BLOCK 374 and generates a new modified V/Hz curve based on the incremented voltage reference command and the current frequency reference command.

Figure 14:
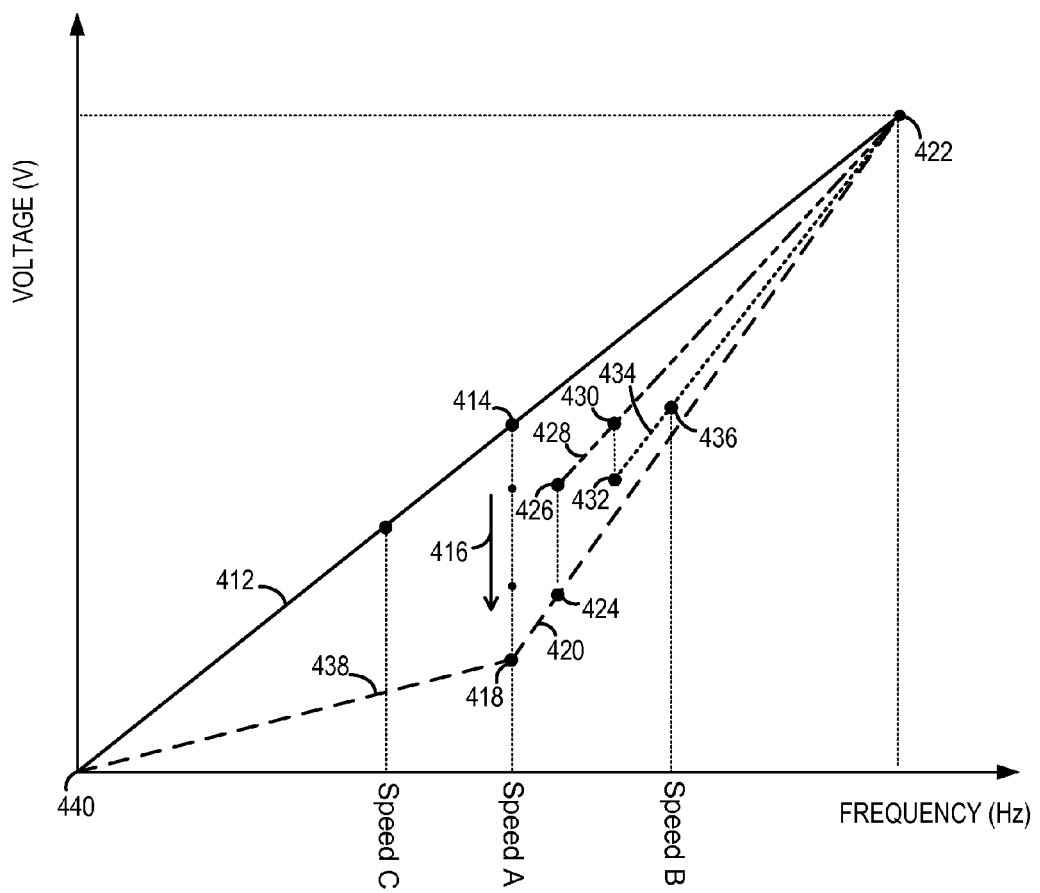
FIG. 14 is a graph illustrating an exemplary initial linear voltage-frequency curve and motor drive operation along a modified voltage-frequency curve for a given motor drive operated according to the motor drive control technique of FIG. 12 according to an embodiment of the invention.

FIG. 14 graphically depicts the dynamic modification of an initial V/Hz curve 412 for an exemplary motor drive, such as motor drive 12 of FIG. 1, operating in accordance with one embodiment of technique 324 (FIG. 12). Referring now to FIGS. 12-14 together where applicable, drive initially operates at point 414 using a default voltage and frequency command defined on initial V/Hz curve 412. While curve 412 is illustrated as being linear, one skilled in the art will recognize that initial curve 412 may be a squared curve or any static, predefined curve. During a period in which the frequency reference remains static, the voltage reference incrementally decreases from point 414 in the direction of arrow 416 to a point 418 of optimal operation, as described with respect to BLOCKS 336, 340, 342, 350, and 354.

If, while operating at point 418 (speed A), the drive receives a command to operate at a different frequency reference (speed B), the reference frequency and voltage are incrementally increased in accordance with subroutine 372. Instead of resetting operation to initial V/Hz curve 412 as previous described with respect to FIG. 11, the frequency and voltage references are initially incrementally increased along linear path 420, which is defined between point 418 and the field weakening point 422 of initial V/Hz curve 412 (BLOCKS 374, 376). As the voltage and frequency references increase, the reference motor parameters are monitored to detect for any adverse motor conditions, such as a potential motor fault or failure, and to determine whether optimal operation has been reached, as set forth in BLOCKS 378, 380, 384, and 400.

As an illustrative example, at point 424 an adverse motor condition is detected (BLOCK 380). The condition is determined to not be serious (BLOCK 392, 408) so the drive receives a command to increment the voltage reference to point 426 to stabilize motor operation (BLOCK 410). Once motor operation is stabilized, the reference frequency and voltage are again incrementally increased toward speed B. The incremental increases follow a new linear path 428, defined between point 426 and field weakening point 422 (BLOCKS 374, 376). While the frequency and voltage references are increased, the reference motor parameters are monitored to determine whether optimal operation has been reached (BLOCKS 378, 380, 384, 400). If optimal operation has been reached 356, the frequency and voltage references continue to increase along path 428 (BLOCK 376). At point 430, if optimal operation has not been reached 404, the voltage reference is adjusted (BLOCK 406) as indicated by point 432. The voltage and frequency references then continue to increase along a new linear path 434 defined between point 432 and field weakening point 422 until the frequency reference reaches desired speed B at point 436 (BLOCKS 374, 376).

Referring back to point 418 (speed A), if the drive had received a command to operate at a decreased frequency reference such as speed C, the frequency and voltage references would be incrementally decreased in a similar manner as described above. For example, the frequency and voltage reference commands initially decrease along linear path 438 between point 418 and origin 440. Incremental adjustments to the frequency and voltage references would occur based on any adverse motor conditions and to achieve optimal operation as explained above until the desired operation at speed C is achieved.

Figure 15:
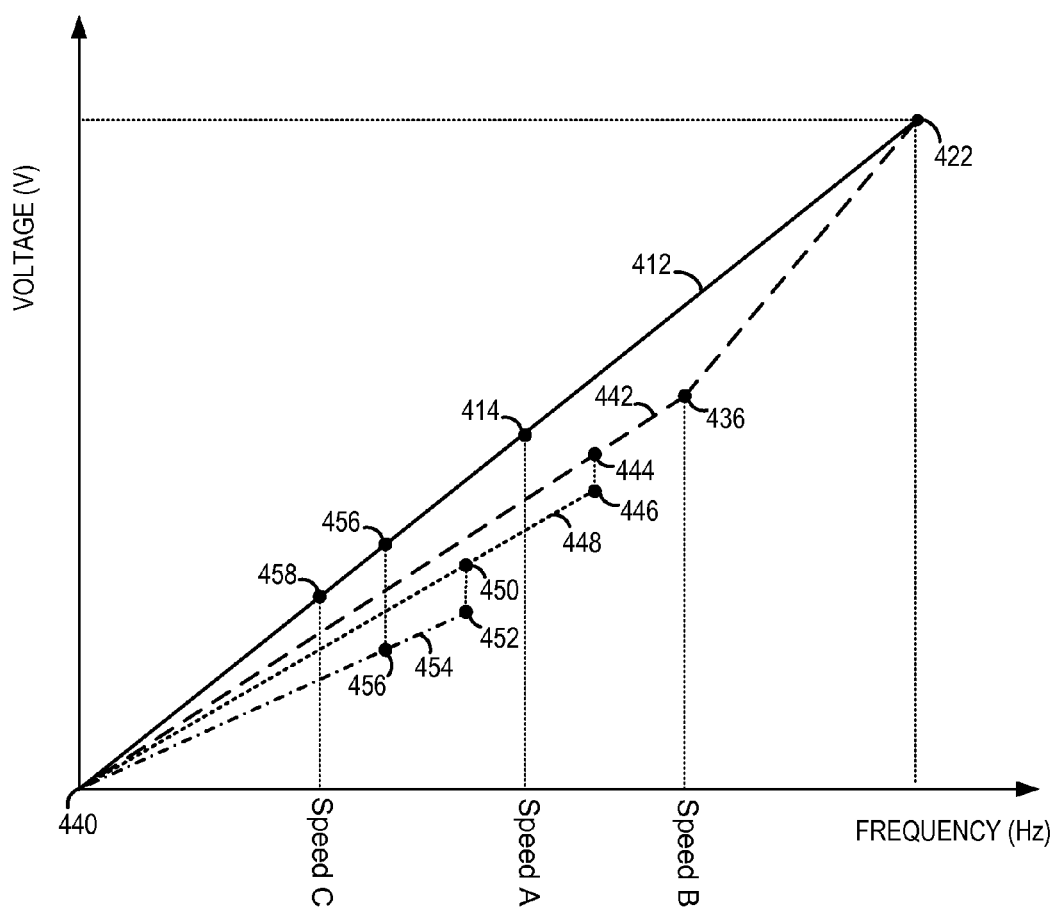
FIG. 15 is a graph illustrating an exemplary initial linear voltage-frequency curve and motor drive operation along a modified voltage-frequency curve for a given motor drive operated according to the motor drive control technique of FIG. 12 according to an embodiment of the invention.

FIG. 15 illustrates adjustment of voltage and frequency reference commands in the event that the drive receives a command to operate at a decreased frequency reference such as speed C while operating at point 436 (speed B). Initially, the reference frequency and voltage are incrementally decreased along a linear path 442, which is defined between point 436 and origin 440 (BLOCKS 374, 376). The voltage and/or frequency references continue to be incrementally decreased as illustrated in FIG. 15 until the desired frequency reference (speed C) is attained.

If, for example, at point 444, it is determined that optimal operation has not been reached (BLOCK 400, 404), the voltage reference is decreased to point 446 (BLOCK 406). The voltage and frequency references are then incrementally decreased along the linear path 448, defined between point 446 and origin 440 (BLOCKS 374, 376). At point 450 the voltage reference may again decrease to point 452 due to, for example, a load change or in an effort to achieve optimal operation (BLOCK 406). The voltage and frequency references next incrementally decrease following linear path 454, defined between point 452 and origin 440 (BLOCKS 374, 376).

If, at point 456, a serious motor condition is detected (BLOCKS 360, 392, 394) the voltage reference is reset to the initial V/Hz curve 412 following the master reset subroutine (BLOCK 396). If the desired frequency reference has not yet been reached (BLOCK 384, 398), the voltage and frequency references may be incrementally decreased along either the initial V/Hz curve 412 until the frequency reference reaches speed C at point 458, as shown in FIG. 15, or along a modified V/Hz curve. While operating at speed C, the voltage reference may be incrementally decreased in response to load changes and in an effort to achieve optimal operation.

As one skilled in the art will readily recognize, while FIGS. 14 and 15 depict several exemplary series of adjustments to voltage and/or frequency references occurring after a change in the frequency reference, the incremental adjustments to the voltage and/or frequency references may occur in any number of alternative combinations in order to respond to monitored load changes, achieve optimal operation, stabilize motor operation, and achieve the desired operation speed.

While several embodiments of the invention are described with respect to an AC motor and AC motor drive, it is contemplated that the energy-optimizing technique set forth herein may be applied to a wide variety of applications. For example, the energy-optimizing technique may be used in hybrid vehicles to minimize power output or draw from a battery system or in an uninterruptible power supply (UPS) with a variable load, such as for lighting systems. The technique may also be used in any application that uses a PWM inverter, such as, for example, semiconductor applications having PWM power converters or in general inverter applications to change a switching algorithm. The technique can be used for a variety of voltage levels, including low-voltage, medium-voltage and high-voltage applications.

The control system for controlling an AC motor drive can be viewed as having units (virtual) to perform or conduct the aforementioned acts of a processor. For example, the control system comprises a unit to input an initial voltage-frequency command to the AC motor drive based on an initial voltage/frequency (V/Hz) curve, and a unit to receive a real-time output of the AC motor drive generated according to the initial voltage-frequency command. The control system also comprises a unit to feedback a plurality of modified voltage-frequency commands to the AC motor drive, each of the plurality of modified voltage-frequency commands comprising a deviation from the initial V/Hz curve, a unit to determine a real-time value of the motor parameter corresponding to each of the plurality of modified voltage-frequency commands, and a unit to feedback a modified voltage-frequency command to the AC motor drive so that the real-time value of the motor parameter is within a motor parameter tolerance range.

A technical contribution for the disclosed method and apparatus is that it provides for a control unit-implemented technique for modifying a voltage-frequency command of an AC motor drive. Based on a modified voltage-frequency command, the technique controls switching time of a series of switches in a motor control device to reduce a motor torque and a motor input power.

Therefore, according to one embodiment of the present invention, a control system for controlling a drive for an AC motor is programmed to input an initial voltage-frequency command to the drive, the initial voltage-frequency command comprising a voltage reference and a frequency reference corresponding to an operating point of an initial voltage/frequency (V/Hz) curve, monitor a real-time output of the drive, modify the voltage reference based on the real-time output of the drive, and transmit a modified voltage-frequency command to the drive, the modified voltage-frequency command corresponding to an operating point of a modified V/Hz curve defined by the modified voltage reference and the initial V/Hz curve.

According to another embodiment of the present invention, a method for controlling an output of a motor drive includes operating the motor drive according to a static voltage-frequency profile to generate an output power to drive a motor and determining an initial value of a specified motor parameter corresponding to the static voltage-frequency profile. The method also includes modifying a voltage reference command during operation of the motor drive to generate a reduced motor input power, defining a modified voltage-frequency profile based on the modified voltage reference command and an operating point of the static voltage-frequency profile, and operating the motor drive according to the modified voltage-frequency profile.

According to yet another embodiment of the present invention, a motor drive is configured to supply power to a load and includes an inverter designed to provide power to the load and a controller operationally connected to control operation of the inverter. The controller is configured to monitor a real-time value of a motor parameter during operation of the motor drive and incrementally adjust a voltage reference during operation of the motor drive based on the real-time value of the motor parameter to cause the inverter to operate at a modified operation point, wherein the modified operation point comprises a deviation from an initial V/Hz curve. The controller is further configured to define a modified V/Hz curve based on the modified operation point and an operating point of the initial V/Hz curve and incrementally adjust a voltage-frequency command according to the modified V/Hz curve.

The present invention has been described in terms of preferred embodiments, and it is recognized that equivalents, alternatives, and modifications, aside from those expressly stated, are possible and within the scope of the appending claims.

What is claimed is:

1. A non-transitory control system for controlling a drive for an AC motor, the control system programmed to:
    input an initial voltage-frequency command to the drive, the initial voltage-frequency command comprising a voltage reference and a frequency reference corresponding to an operating point of an initial voltage/frequency (V/Hz) curve, the initial V/Hz curve including a defined bound comprising one of an origin of the initial V/Hz curve and a field weakening point of the initial V/Hz curve;
    monitor a real-time output of the drive;
    modify the voltage reference based on the real-time output of the drive; and
    transmit a modified voltage-frequency command to the drive, the modified voltage-frequency command corresponding to an operating point of a modified V/Hz curve defined by the modified voltage reference and the defined bound of the initial V/Hz curve.

2. The non-transitory control system of claim 1 further programmed to define the modified V/Hz curve as a linear path between the operating point of the modified voltage-frequency command and the defined bound of the initial V/Hz curve, the defined bound of the intial V/Hz curve comprising the field weakening point of the V/Hz curve.

3. The non-transitory control system of claim 1 further programmed to define the modified V/Hz curve as a linear path between the operating point of the modified voltage-frequency command and the defined bound of the initial V/Hz curve, the defined bound of the intial V/Hz curve comprising the origin of the initial V/Hz curve.

4. The non-transitory control system of claim 1 further programmed to:
    detect a motor condition based on the real-time output of the drive; and
    adjust the modified voltage reference of the modified voltage-frequency command if the motor condition is detected.

5. The non-transitory control system of claim 4 further programmed to:
- define a second modified V/Hz curve based on the adjusted voltage reference; and
- transmit a second modified voltage-frequency command to the drive corresponding to an operating point on the second modified V/Hz curve.

6. The non-transitory control system of claim 5 further programmed to define the second modified V/Hz curve based on the defined bound of the initial V/Hz curve, the defined bound of the initial V/Hz curve comprising one of the origin of the initial V/Hz curve and the field weakening point of the initial V/Hz curve.

7. The non-transitory control system of claim 4 further programmed to reset the modified voltage-frequency command to an operating point of the initial V/Hz curve if the motor condition is detected.

8. The non-transitory control system of claim 1 wherein the real-time output of the AC motor comprises one of a motor rms voltage, a motor rms current, a motor input power, a motor speed, a motor slip, a motor power factor, a motor efficiency, and a motor temperature.

9. The non-transitory control system of claim 1 further programmed to determine a value of a motor parameter based on the real-time output of the drive, the motor parameter comprising at least one of a motor voltage, a motor current, a motor torque, a motor speed, a motor slip, a motor power factor, a motor efficiency, and a motor temperature.

10. The non-transitory control system of claim 1 further programmed to transmit a plurality of incremental modified voltage-frequency commands to modify the operating speed of the AC motor.

11. A method for controlling an output of a motor drive comprising:
- operating the motor drive according to a static voltage-frequency profile to generate an output power to drive a motor, the static voltage-frequency profile including an origin point and a field weakening point;
- determining an initial value of a specified motor parameter corresponding to the static voltage-frequency profile;
- modifying a voltage reference command during operation of the motor drive to generate a reduced motor input power;
- defining a modified voltage-frequency profile based on the modified voltage reference command and at least one of the origin point and the field weakening point of the static voltage-frequency profile; and
- operating the motor drive according to the modified voltage-frequency profile.

12. The method of claim 11 further comprising:
- determining a tolerance zone of the specified motor parameter; and
- selectively modifying the voltage reference command during operation of the motor drive to maintain the specified motor parameter within the tolerance zone.

13. The method of claim 11 further comprising determining a value of the specified motor parameter for each modification of the voltage reference command.

14. The method of claim 11 wherein determining the value of the specified motor parameter comprises determining the value of one of a motor rms voltage, a motor rms current, a motor input power, a motor speed, a motor slip, a motor power factor, a motor efficiency, and a motor temperature.

15. The method of claim 11 further comprising:
- monitoring the specified motor parameter to detect an undesirable motor condition; and
- incrementally increasing the voltage reference command if the undesirable motor condition is detected.

16. A motor drive configured to supply power to a load, the motor drive comprising:
- an inverter designed to provide power to the load; and
- a controller operationally connected to control operation of the inverter, the controller configured to:
  - monitor a real-time value of a motor parameter during operation of the motor drive;
  - incrementally adjust a voltage reference during operation of the motor drive based on the real-time value of the motor parameter to cause the inverter to operate at a modified operation point, wherein the modified operation point comprises a deviation from an initial V/Hz curve, the initial V/Hz curve including an origin point and a field weakening point;
  - define a modified V/Hz curve based on the modified operation point and at least one of the origin point and the field weakening point of the initial V/Hz curve; and
  - incrementally adjust a voltage-frequency command according to the modified V/Hz curve.

17. The motor drive of claim 16 wherein the controller is further configured to:
- identify a tolerance zone for the motor parameter; and
- incrementally adjust the voltage reference during operation of the motor drive to maintain the motor parameter within the tolerance zone.

18. The motor drive of claim 16 wherein the monitored real-time motor parameter comprises one of a motor voltage, a motor current, a motor torque, a motor speed, a motor slip, a motor power factor, a motor efficiency, and a motor temperature.

* * * * *

UNITED STATES PATENT AND TRADEMARK OFFICE
CERTIFICATE OF CORRECTION

| | | |
|---|---|---|
| PATENT NO. | : 9,148,083 B2 | Page 1 of 1 |
| APPLICATION NO. | : 13/551973 | |
| DATED | : September 29, 2015 | |
| INVENTOR(S) | : Olsson et al. | |

It is certified that error appears in the above-identified patent and that said Letters Patent is hereby corrected as shown below:

On the Title Page, item (75): delete "Ting Yan, Menomonee Fallas," and substitute therefore -- Ting Yan, Menomonee Falls, --.

Signed and Sealed this
Fifth Day of April, 2016

Michelle K. Lee
*Director of the United States Patent and Trademark Office*